(12) United States Patent
Ash et al.

(10) Patent No.: US 11,196,187 B2
(45) Date of Patent: *Dec. 7, 2021

(54) UNIVERSAL END CLAMP FOR SECURING A SOLAR PANEL TO A RAIL SUPPORT GUIDE

(71) Applicant: Ironridge, Inc., Hayward, CA (US)

(72) Inventors: Jon Ash, Phoenix, AZ (US); Anumeha Narain, Leesburg, VA (US); Joseph Sirochman, Prescott, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,102

(22) Filed: May 11, 2020

(65) Prior Publication Data

US 2020/0274258 A1 Aug. 27, 2020

Related U.S. Application Data

(63) Continuation of application No. 16/311,743, filed as application No. PCT/US2017/065285 on Dec. 8, 2017, now Pat. No. 10,673,151.

(60) Provisional application No. 62/432,433, filed on Dec. 9, 2016.

(51) Int. Cl.
*H01R 4/24* (2018.01)
*H01R 4/30* (2006.01)
*H02S 30/00* (2014.01)

(52) U.S. Cl.
CPC .............. *H01R 4/24* (2013.01); *H01R 4/308* (2013.01); *H02S 30/00* (2013.01); *Y02B 10/10* (2013.01)

(58) Field of Classification Search
CPC ............ H01R 4/24; H01R 4/308; H02S 30/00
See application file for complete search history.

(56) References Cited

U.S. PATENT DOCUMENTS

| | | | |
|---|---|---|---|
| 8,957,302 B1 | 2/2015 | Seery et al. | |
| 9,057,545 B2 | 6/2015 | Stapleton | |
| 9,473,065 B2 | 10/2016 | Seery et al. | |
| 2011/0000525 A1 | 1/2011 | Wu | |
| 2012/0048351 A1 | 3/2012 | Rizzo | |
| 2015/0129517 A1* | 5/2015 | Wildes | F24S 25/61 211/41.1 |
| 2015/0325738 A1 | 11/2015 | Seery et al. | |
| 2016/0190975 A1* | 6/2016 | Scoggins | H02S 20/20 248/229.15 |
| 2016/0226435 A1* | 8/2016 | Almy | H02S 20/23 |

(Continued)

FOREIGN PATENT DOCUMENTS

DE 202006018586 U1 3/2007
DE 102008064554 A1 7/2010
(Continued)

*Primary Examiner* — Truc T Nguyen
(74) *Attorney, Agent, or Firm* — Lance C. Venable; Law Office of Lance C. Venable, PLLC

(57) ABSTRACT

In various representative aspects, the present invention relates generally to providing an apparatus for securing a solar panel module to a solar panel rail guide structure. More specifically, the invention relates to providing an end clamp that mounts a bottom flange of a solar panel module to a solar panel rail guide structure. The end clamp does not require any tools for insertion. It mechanically fastens and electrically bonds the solar panel module to a solar panel rail guide structure.

18 Claims, 22 Drawing Sheets

(56) References Cited

U.S. PATENT DOCUMENTS

| | | | |
|---|---|---|---|
| 2016/0282016 A1* | 9/2016 | Ash | H02S 20/10 |
| 2016/0285408 A1* | 9/2016 | Ash | H02S 40/34 |
| 2017/0063301 A1* | 3/2017 | Ash | H01R 25/162 |
| 2017/0085219 A1* | 3/2017 | Ash | F16B 7/187 |
| 2019/0154306 A1* | 5/2019 | Rothschild | H02S 30/10 |

FOREIGN PATENT DOCUMENTS

| | | |
|---|---|---|
| DE | 102011010832 A1 | 8/2012 |
| DE | 202013005668 U1 | 10/2014 |
| DE | 102013009834 A1 | 12/2014 |
| FR | 2969744 A1 | 6/2012 |

\* cited by examiner

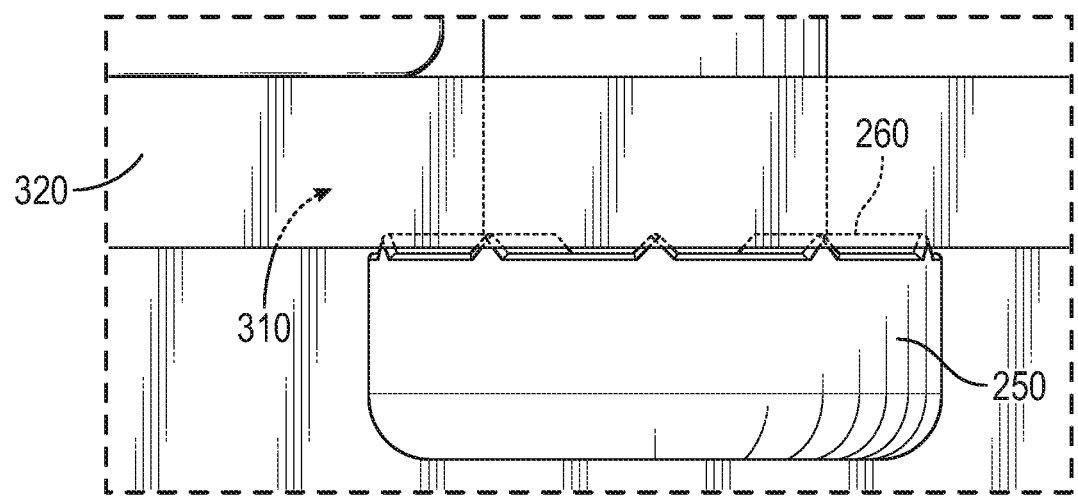
FIG. 31
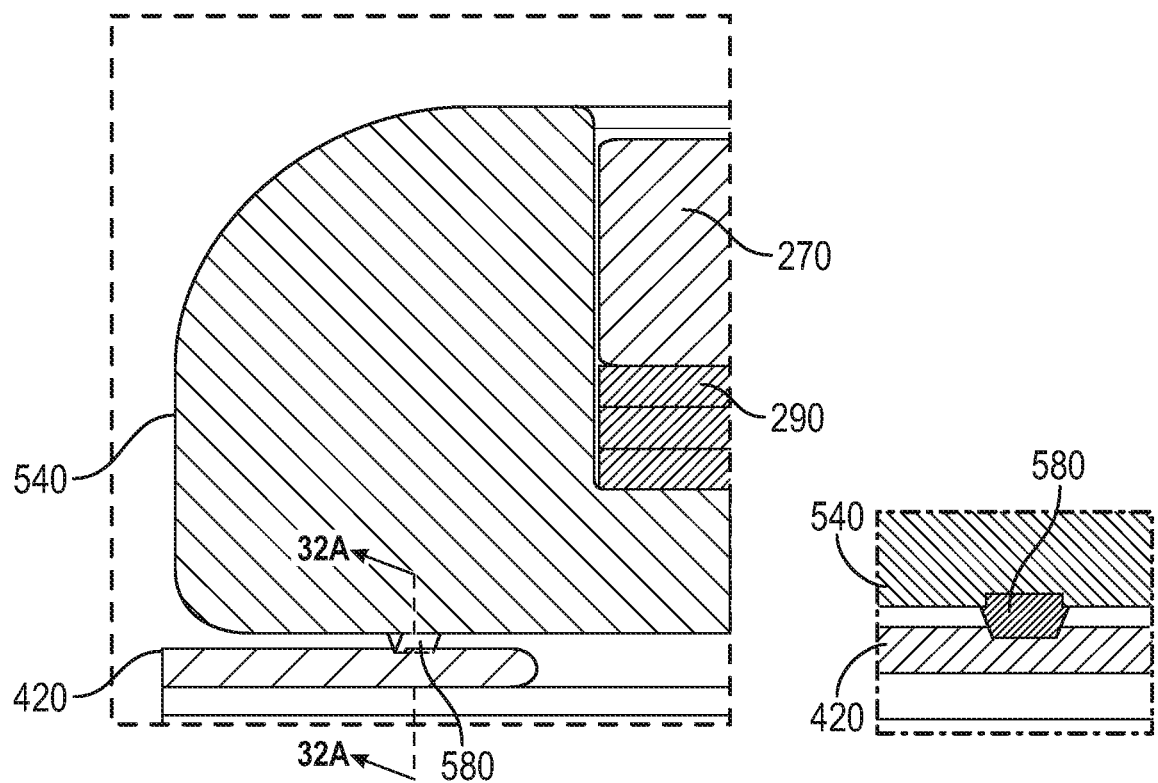
FIG. 32
FIG. 32A

UNIVERSAL END CLAMP FOR SECURING A SOLAR PANEL TO A RAIL SUPPORT GUIDE

BACKGROUND OF INVENTION

Field of the Invention

The present invention relates generally to providing an apparatus for securing a solar panel module to a solar panel rail guide support structure. More specifically, the invention relates to providing an end clamp that mounts a bottom flange of a solar panel module to a solar panel rail guide support structure. The end clamp does not require any tools for insertion. It mechanically fastens and electrically bonds the solar panel module to the solar panel rail guide support structure. Exemplary embodiments for both a single and dual-handle structure are disclosed.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. This is particularly true when the components must be installed on a roof that links to a rail guide structure for supporting the solar panel array. Within this type of structure, it is desirable to provide electrical connectivity between each rail guides.

One method that solar panel modules may be secured to a residential roof structure is by providing parallel rows of rail guides that are secured to the roof. Solar panel modules are then placed on top of the array of rail guides, and are then mechanically coupled to the top of the rail guides. There are several ways employed in the prior art to secure the solar panel modules to the array guides. As shown in FIGS. 1 and two, end clamps and mid-clamps are typically placed between or at the ends of adjacent solar panel modules and are then clamped together by tightening the clamp between a slot on top of the rail guide and the top of the solar panel module. In some instances, the clamps are electrically coupled between the rail guide and the solar panel module so that an electrical path can exist between all of the electrical components that connect to the solar panel array, and the rail guides themselves.

One of the limitations of using end clamps and mid-clamps is that it can be time-consuming to align the clamps between the slots in the rail guides with the top surfaces of the solar panel modules. Another limitation is that in order to tighten the end clamps and mid-clamps, additional tools are typically required. Since standard end clamps are external to an array, placed on the outside of the solar panel module, they require additional length of rail to be secured beyond the module frame. This results in extra segments of rails that protrude from the array as well as hardware that is visible from a distance.

It would be desirable to provide an apparatus that can both easily secure solar panel modules to rail guides, electrically bond the solar panel modules to the rail guides, and complete the task without the use of additional tools.

The present invention overcomes these limitations and offers a solution that provides an easy-to-use clamp that can secure and electrically bond a solar panel module to a rail guide, without using additional tools, and all while hiding the clamp from plain view of the solar panel array making it more aesthetically pleasing to anyone viewing the solar panel array on a given roof. The apparatus is also simple to manufacture. In an alternate embodiment, the present invention offers a dual-handle version of the same apparatus that enables a user additional flexibility in securing a solar panel module to a rail guide from either side of a rail guide.

SUMMARY OF THE INVENTION

The invention is summarized below only for purposes of introducing embodiments of the invention. The ultimate scope of the invention is to be limited only to the claims that follow the specification.

It is an object of this invention to provide an assembly for joining and electrically bonding a solar panel to a solar panel rail guide that requires no tools to install and is hidden from plain view within the solar panel array.

It is a further object of this invention that the assembly comprise a clamp with front and rear ends, with a channel in the front end that houses a post structure with a shaft between a top and bottom washer on each side of the post structure and a spring coupled between the two end washers, such that the spring rests between a base of the channel and the top washer.

It is a further object of this invention that the bottom washer is configured to fit within, and move along, a channel of the solar panel rail guide.

It is a further object of this invention that the bottom washer comprises at least one serration on its top surface configured to penetrate the surface layer of a solar panel rail guide channel.

It is a further object of this invention that the bottom surface of the clamp comprises at least one raised portion that extends downward from the surface of the clamp and is configured to penetrate the surface layer of a solar panel.

It is a further object of this invention that the top washer is coupled to the shaft and is configured to compress the spring when the rear end of the handle is moved to a locked position.

It is a further object of the present invention that each raised portion may be removed from the clamp.

It is a further object of the present invention that the spring comprises one or more disc springs configured to create a clamping force when compressed and provide flexibility to accommodate various module frame geometries.

It is a further object of the present invention that rear end of the handle is configured to provide tactile feedback when the handle is moved into a locked position, and when the bottom washer is within a top channel of a solar panel rail guide.

It is a further object of the present invention that the clamp may also comprise a first and second handle each extending outward from the front end, each of the first and second handles further comprising a rear end.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 31 is a close-up cross-sectional view of the post engaging the slot of the solar panel rail guide shown in FIG. 30.

FIG. 32 is a close-up cross-sectional view of the head of the clamp shown in FIG. 30 engaging the flange of a solar panel frame.

FIG. 32A is a cross-sectional close-up view of a portion of FIG. 32.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed. More generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
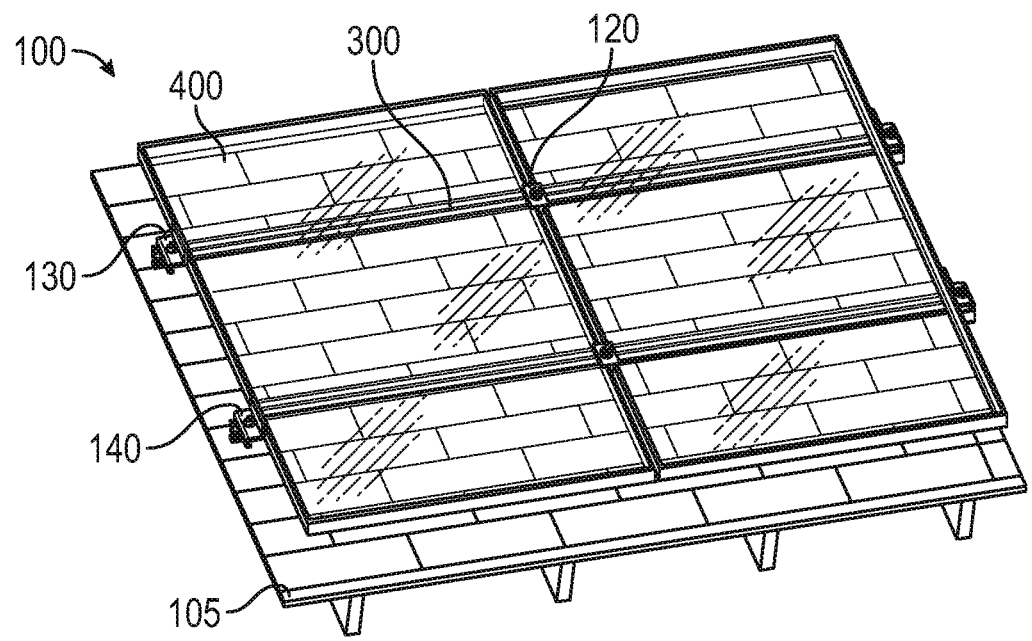
FIGS. 1 and 2 illustrate perspective views of a prior art solar panel array that utilizes mid-clamps and end clamps to secure solar panel modules to rail guides.
Figure 2:
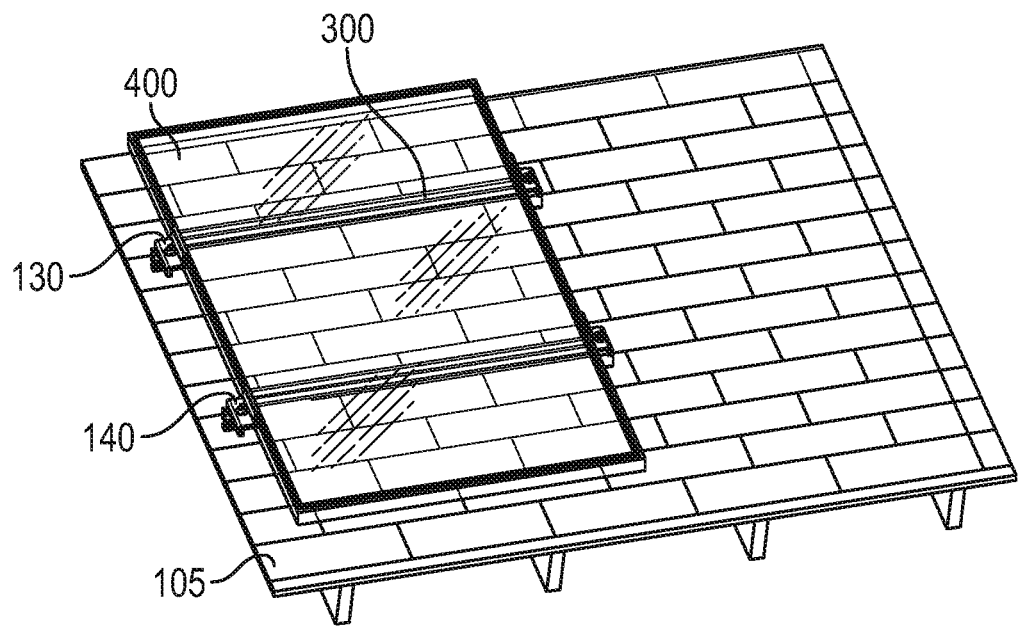

One method that solar panel modules may be secured to a residential roof structure is shown in FIG. 1. In FIGS. 1 and 2, a solar panel array configuration 100 is shown installed on roof 105. The solar panel array includes several solar panel modules 400 that are arranged and secured to several rail guides 300 that are arranged in a parallel fashion across the roof 105. In this configuration, the rail guides 300 are coupled to roof attachments 140. The solar panel modules 400 are then secured to the roof attachments 140 by using end clamps 130 and mid-clamps 120. In this exemplary configuration of the prior art, the end clamps 130 and mid-clamps 120 provide a means to electrically couple the rail guide 300 to the solar panel modules 400 throughout the entire array 100.

Figure 3:
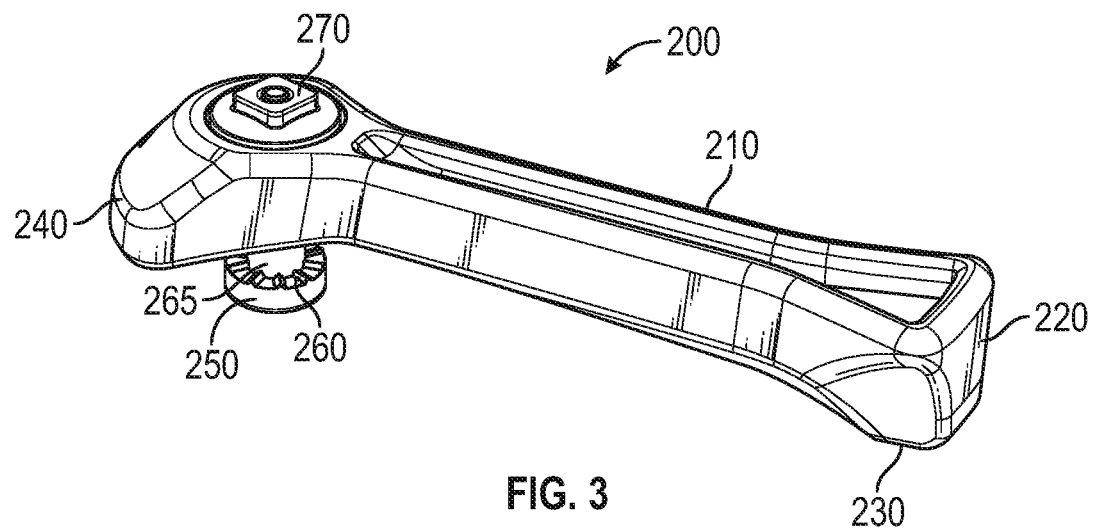
FIG. 3 illustrates a top perspective view of an exemplary universal end clamp.
Figure 5:
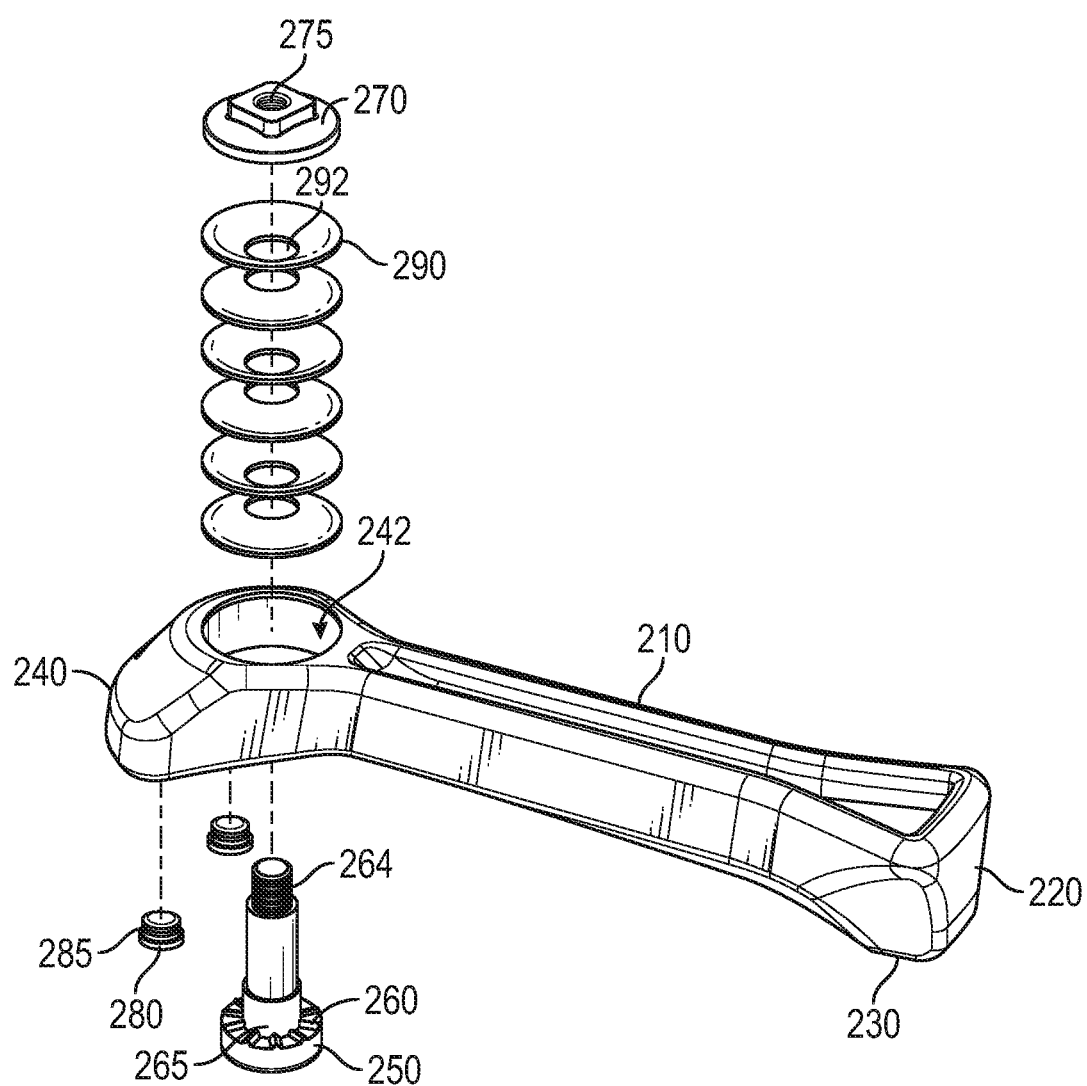
FIG. 5 illustrates a top perspective view of the clamp showing an exploded view of the channel and bonding pins at the head of the clamp.
Figure 7:
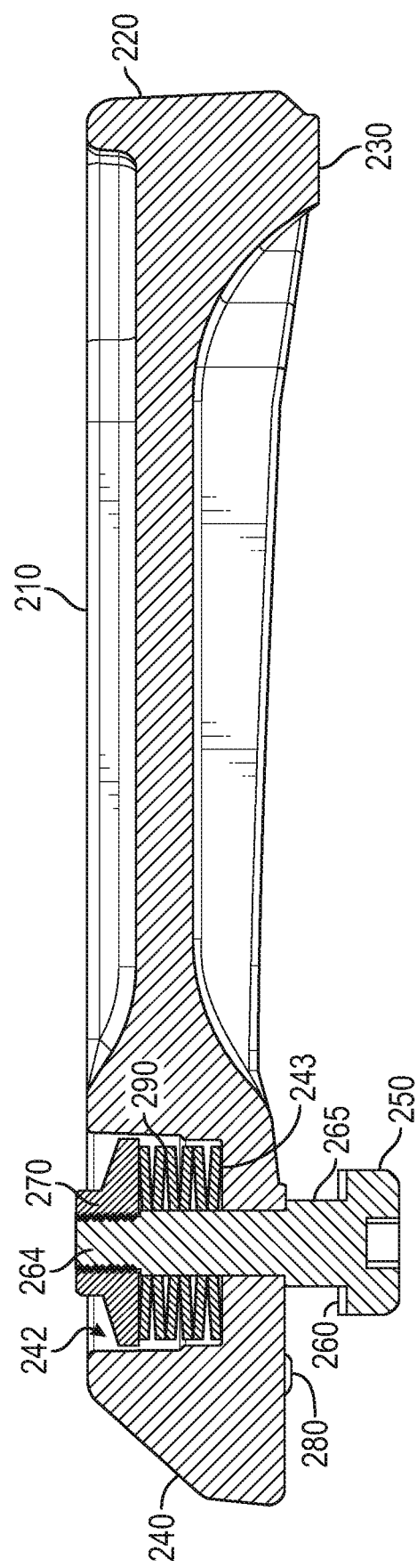
FIG. 7 illustrates a cross-sectional side view of the clamp.
Figure 8:
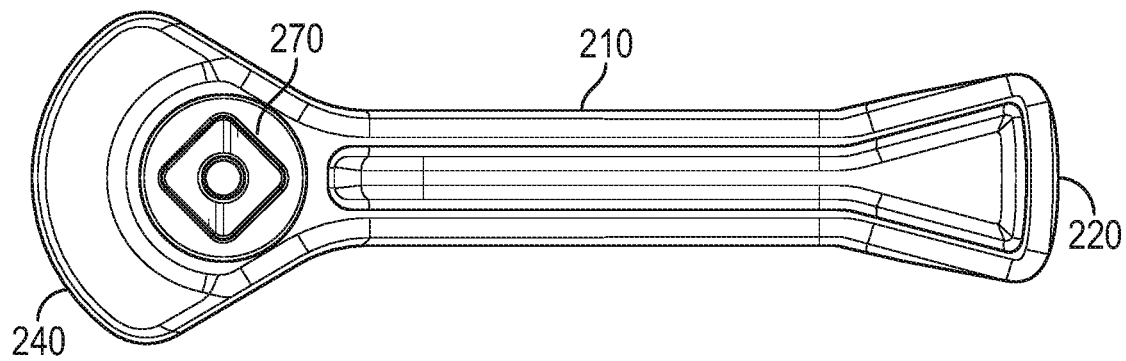
FIG. 8 illustrates a top view of the clamp.
Figure 9:
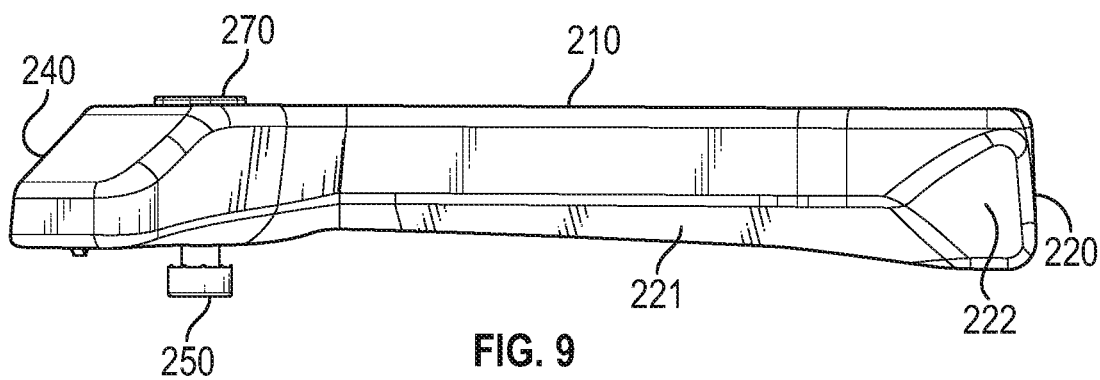
FIG. 9 illustrates a side view of the clamp.
Figure 10:
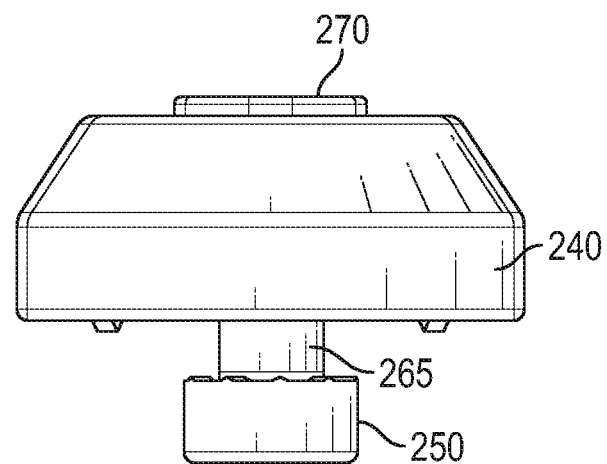
FIG. 10 illustrates a front view of the clamp.
Figure 11:
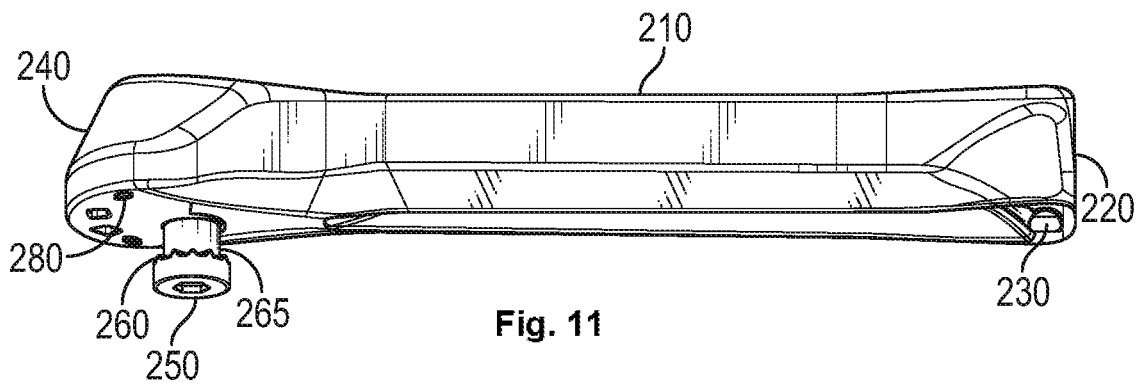
FIG. 11 illustrates a bottom perspective view of the clamp.

FIG. 3 shows a front perspective view of an exemplary universal end clamp 200. The clamp 200 is generally in the shape of a handle 210 that extends from the front end 240 to the back end 220. In this embodiment, the front end 240 is generally round, but can be other suitable shapes as long as it can cover a portion of a bottom flange 420 of a solar panel module as shown in FIGS. 21 and 22. In this exemplary embodiment, the bottom of the front end 240 includes a channel 242. The channel 242 includes a base 243 as shown in FIGS. 5 and 7. Within the channel 242, a post structure 262 fits within the channel 242 at a sufficient distance from the edge of the front end 240, typically in its center, to allow the front end 240 to cover a sufficient portion of the bottom flange 420 when it is in the locked position shown in FIGS. 20-22. The post structure 262 comprises a bottom washer 250 and a shaft 265 that extends upward along and is secured by a top washer 270, typically at a threaded end of the shaft 265. The bottom washer 250 typically has a diameter that is larger than the shaft 265 includes one or more serrations 260.

Figure 4:
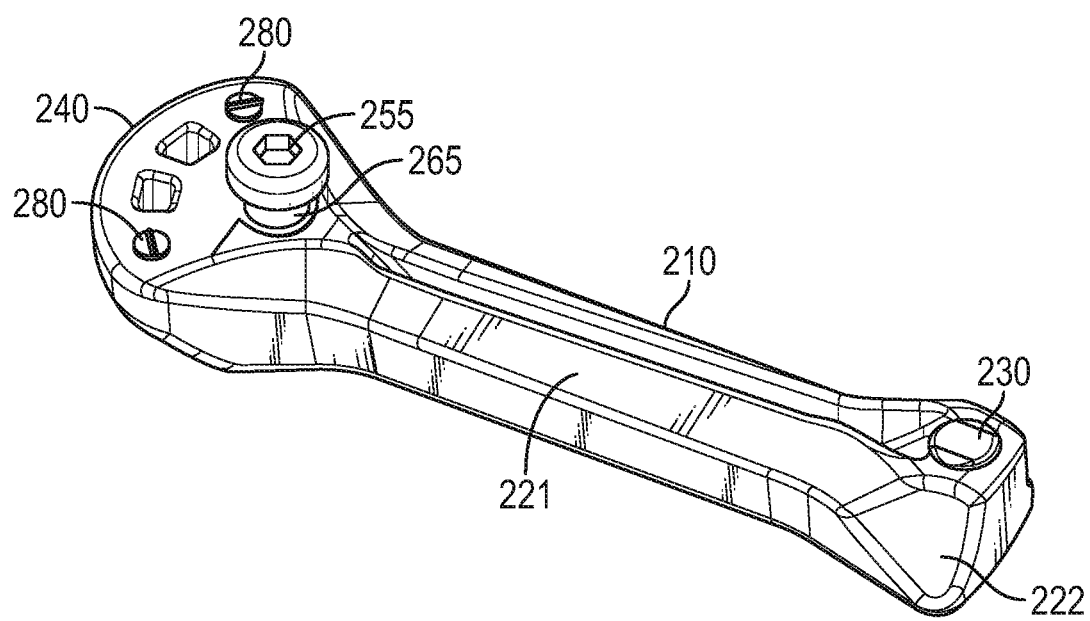
FIG. 4 illustrates a bottom perspective view of the clamp in FIG. 3.

FIG. 4 shows a bottom perspective view of the clamp 200. At the backend 220, the bottom of the backend typically tapers toward a level that includes an extension 230. The bottom surface of the front end 240 is typically at a lower plane than the extension 230. This enables the handle 200 to snap or lock into place on the top channel 310 of the mounting rail 300 when the handle is rotated into a locked position as shown below in FIGS. 20-22 and will be discussed further below. The bottom of the front end 240 includes at least one raised portion such as a bonding pin 280 so that the surface of the bonding pin 280 extends outward from the bottom surface of the front end 240. The bottom washer 250 also includes an optional tool feature 255 for assembly to the top washer 270.

Figure 6:
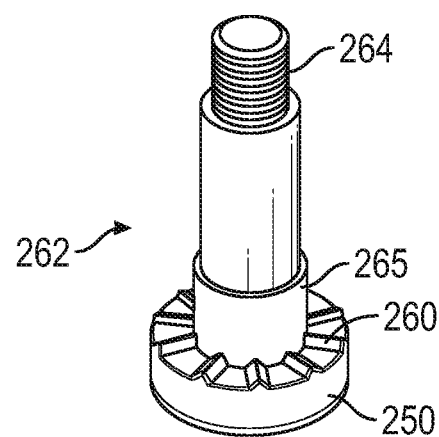
FIG. 6 illustrates a front perspective view of an exemplary post that fits within a slot on a solar panel rail guide.

FIG. 5 illustrates an exploded view of the channel 242 and the front and 240. Bonding pins 280 may be separate pins as shown or any component coupled to the clamp body and including sharp features intended to create an electrical bonding path. They may be positioned, press-fit (as shown), or may include threaded portion to be screwed into a female threaded portion on the bottom surface of the front end 240 although any suitable manner of connecting the bonding pins 280 is acceptable. Their design and orientation may also provide resistance to lateral forces, keeping the module from sliding under loading. FIGS. 5 and 6 show the details of the post structure 262. The post structure 262 shows the shaft 265 extending upward from the bottom washer 250. At the end opposite the bottom washer 250, the post includes a male threaded portion 264 for coupling to the female threaded portion 275 of the top washer 270 by rotating the top washer 270 or the post structure 262 into a tightened position. To provide additional tautness or rigidity when securing the clamp 200, the post structure 262 may also include a series of disc springs 290 or washers are shown stacked in a configuration to create a spring force and deflection range. Each of the springs 290 is in the shape of a cone with a central opening 292. When assembled, the springs 290 are placed against each other so that the tapered central opening 292 of the first spring 290 faces up and is coupled to the second spring 290 with the tapered central opening facing down. This is repeated for each successive pair of springs 290. Although six disc springs 290 are used in this exemplary embodiment, other types of springs, more or less disc springs like washers such as Belleville washers, or disc springs in different configurations (stacked, alternating, or both) can create a different spring force or different deflection range or bearings that can bear a load under compression. This allows for the clamp to fit on different frame thicknesses FIG. 7 shows a cross-sectional side view of the clamp 200. As shown the shaft 265 is inserted through the channel 242 and through the central openings 292 of the springs 290 so that the male threaded portion 264 can be rotatably coupled to the female threaded portion 275 of the top washer 270. When assembled in this fashion, the springs 290 rest on the channel base 243 and compress the washers 292 forming a spring function as the top washer 275 is tightened or lowered along the shaft 265 of the post structure 262. The extension 230 on the backend 220 is positioned slightly lower than the bottom surface of the front end 240. FIGS. 8, 9, 10, and 11 show top, side, front, and bottom-perspective views respectively of the clamp 200.

Figure 12:
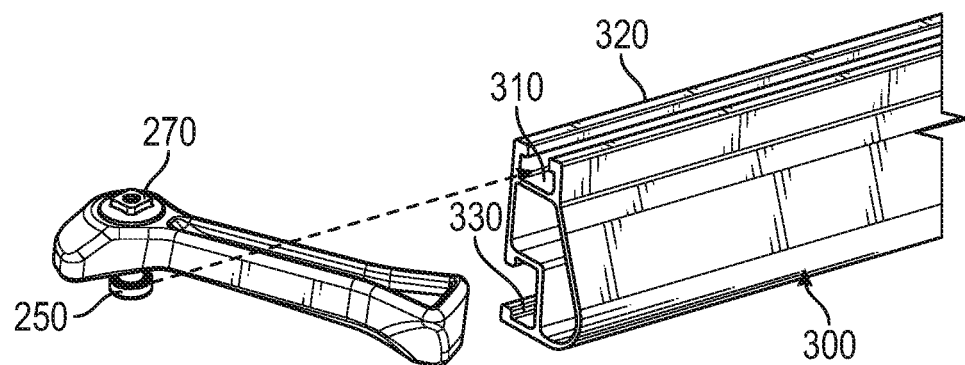
FIG. 12 illustrates a front perspective view of the clamp shown prior to insertion into the slot of the rail guide.
Figure 13:
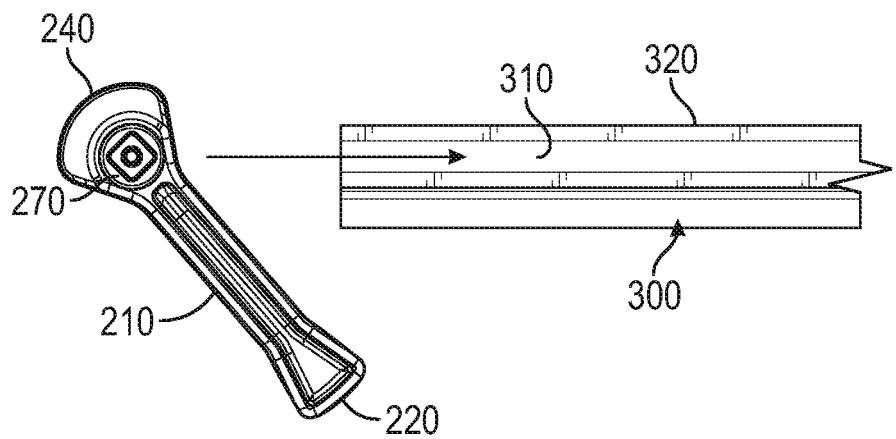
FIG. 13 illustrates a top view of the image in FIG. 12.

FIGS. 12-23 show the steps of using the clamp 200. FIGS. 12 and 13 show a front perspective view and a top view respectively of the clamp 200 before it is engaged with a typical solar panel rail guide 300. The rail guide 300 is typically made of an electrically conducting material that has a surface oxidation layer and is connected to a roof attachment 140 on its lower end 330 so the rail guide 300 is secured lengthwise across a roof as shown in FIGS. 1 and 2. The top of the rail guide 300 includes two side flanges 320 that form a slot or top channel 310.

Figure 14:
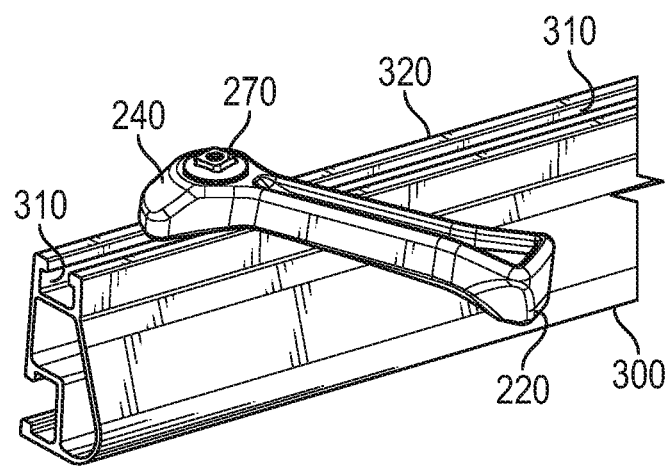
FIG. 14 illustrates a front perspective view of the clamp inserted into the slot of the rail guide.
Figure 15:
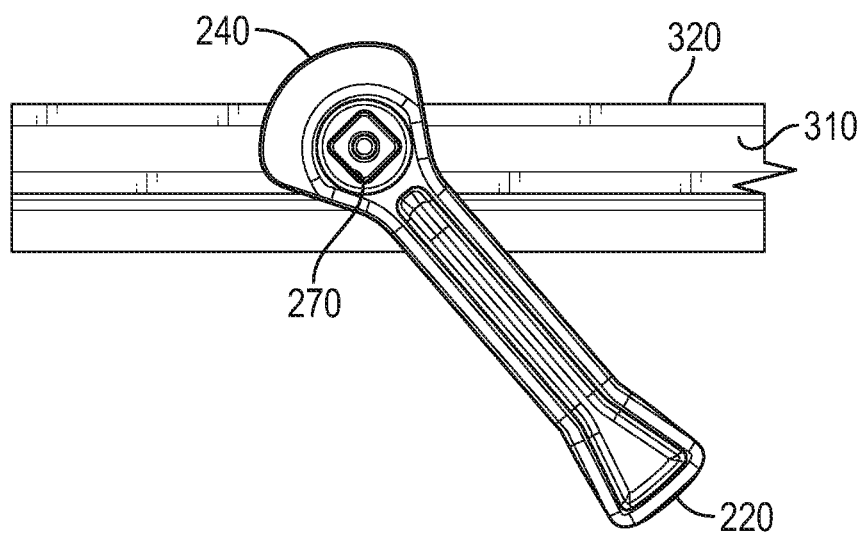
FIG. 15 illustrates a top view of FIG. 14.

The bottom washer 250 of the clamp 200 is first inserted into the opening of the top channel 310 of the rail guide 300 as shown in FIGS. 14 and 15. The bottom washer 250 should be of a suitable width/diameter so that it can freely move along the slot 310, and the shaft 265 should be of a suitable width/diameter so that it is less than the width of the top channel 310, but greater than the width of the opening formed along the two side flanges 320 so that it can both freely move through the top channel 310 and engage the bottom surface of the two side flanges 320.

Figure 16:
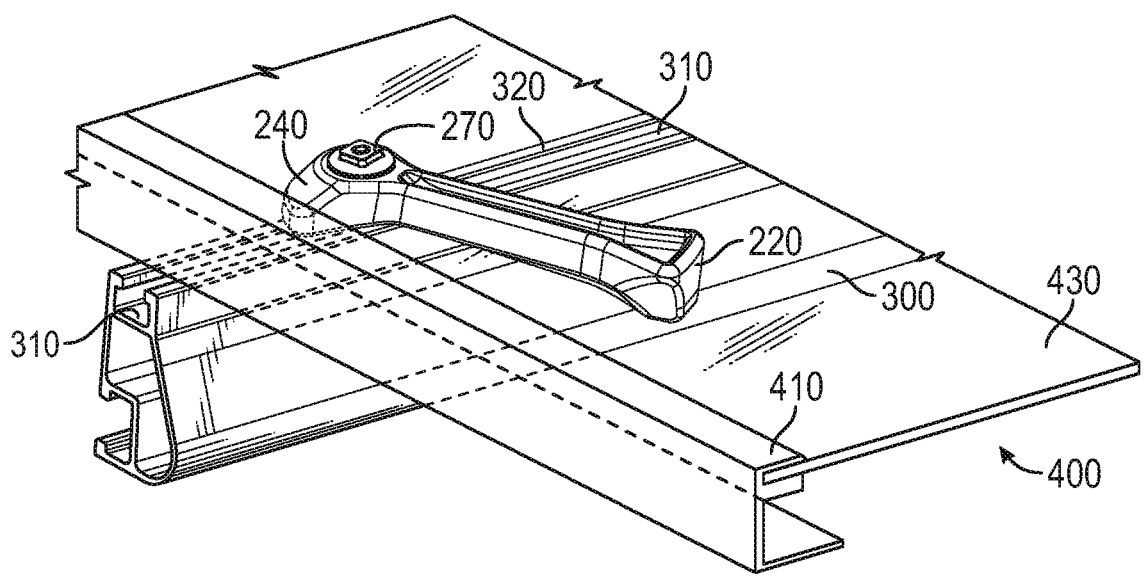
FIG. 16 illustrates the same view shown in FIG. 14 with an exemplary transparent view of a solar panel module resting on top of the rail guide.
Figure 17:
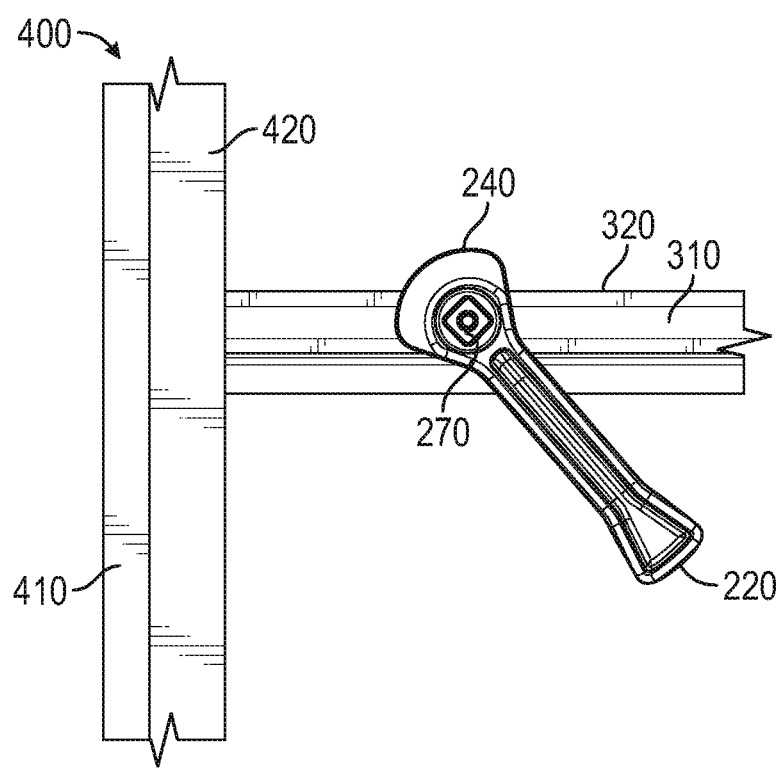
FIG. 17 illustrates the same image in FIG. 15 with the solar panel module resting on top of the solar panel rail guide.
Figure 18:
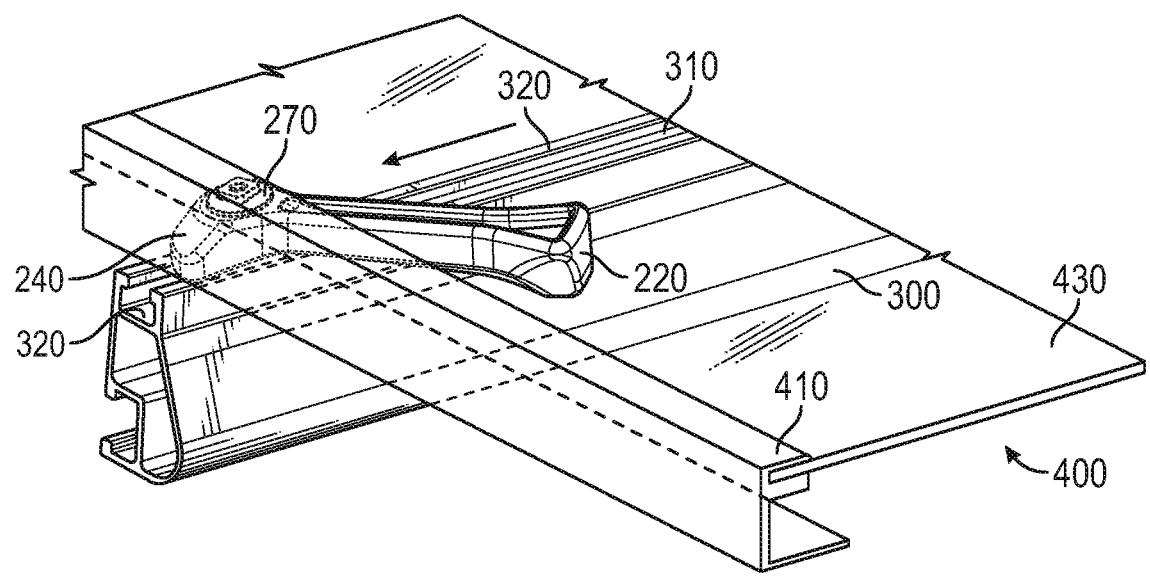
FIG. 18 illustrates the same image in FIG. 16 with the clamp moved into position over the top of a flange at the bottom of the solar panel module.
Figure 19:
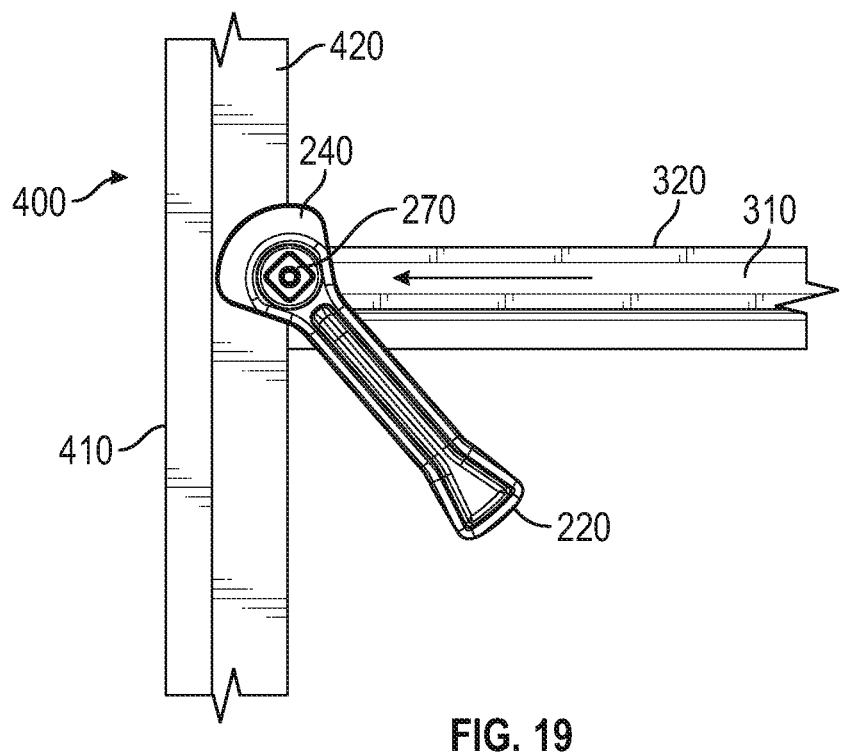
FIG. 19 is a top view of the image in FIG. 18.

Once the clamp 200 is positioned along the rail guide 300, an exemplary solar panel module 400 is positioned perpendicularly on the top of the side flanges 320 of the rail guide 300 as shown in FIG. 16. FIG. 16 illustrates a front perspective view with a transparent view of the rear wall 410 and FIG. 17 illustrates a top view of the image in FIG. 16 showing the solar panel module 400 that further comprises a bottom flange 420 and the top panel 430 (shown in FIG. 23). The bottom flange 420 typically comprises an electrically conducting material with a surface oxidation layer. Once the solar panel module 400 is positioned along the top of the side flanges 320 of the rail guide 300, the clamp 200 is moved toward the solar panel module 400 as shown in FIG. 18 so that the front end 240 of the clamp 200 is covering a portion of the bottom flange 420 of the solar panel module 400 as shown in FIG. 19. This typically occurs by moving the clamp 200 so that the shaft 265 directly contacts the edge of the bottom flange 420.

Figure 20:
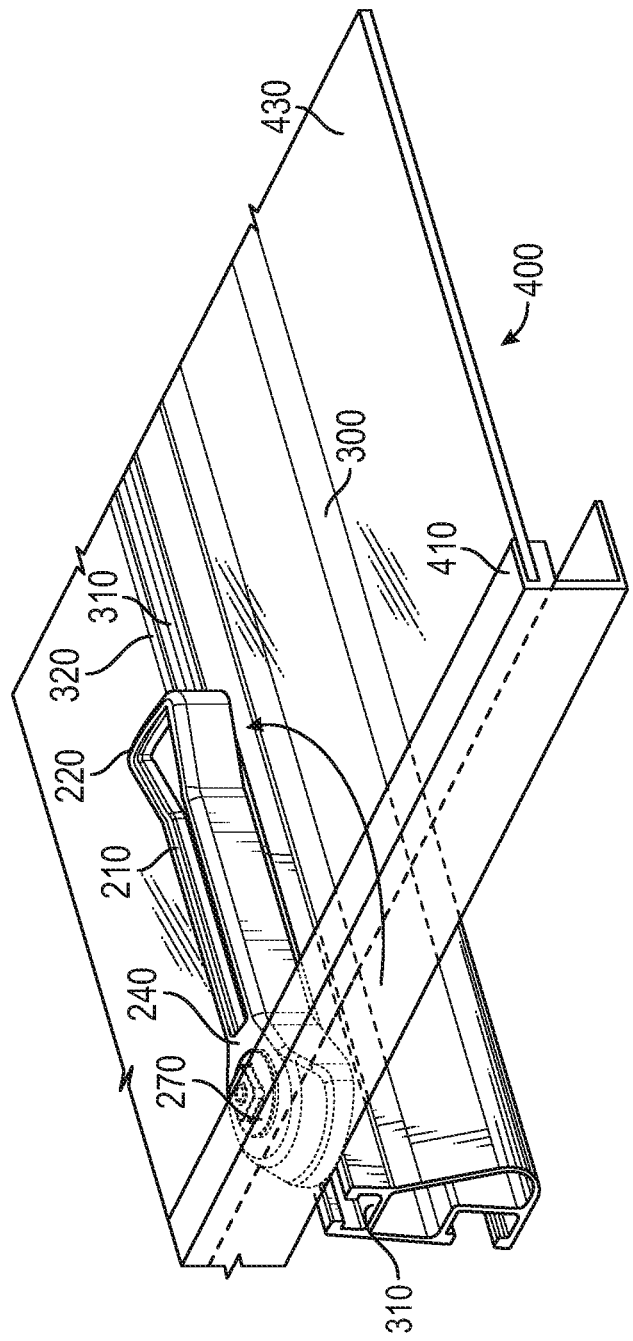
FIG. 20 is a front perspective view showing the clamp rotated to its final position with both the front and rear of the clamp engaging the rail guide.
Figure 21:
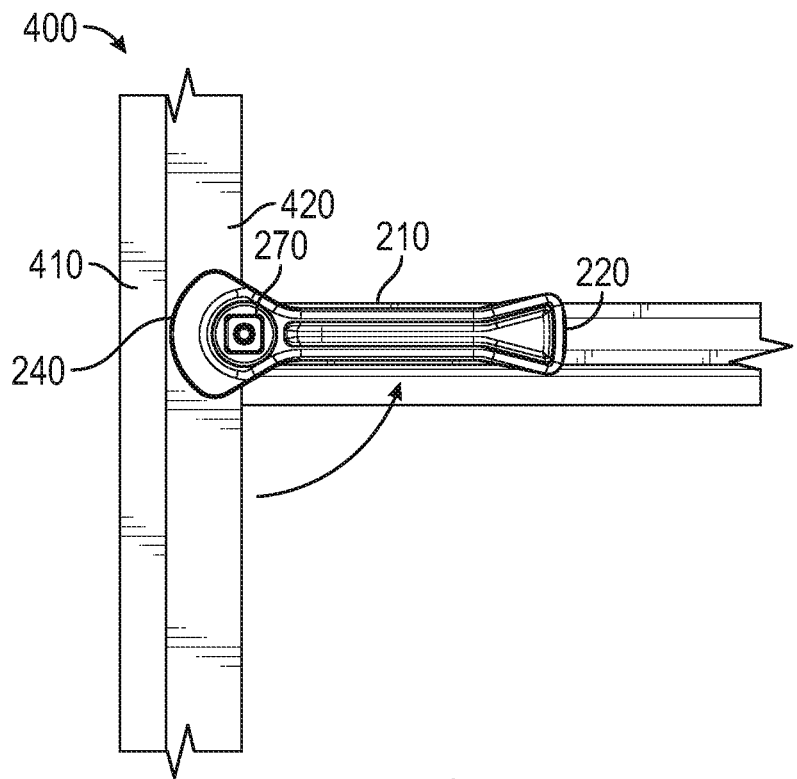
FIG. 21 is a top view of the image in FIG. 20.
Figure 22:
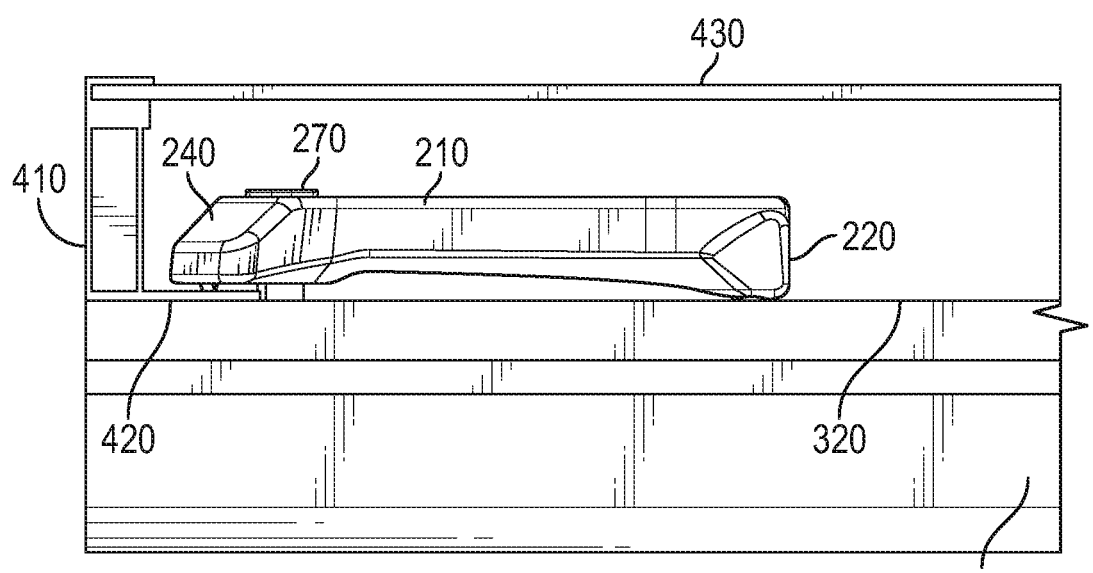
FIG. 22 is a side view of the images and FIGS. 20 and 21.
Figure 23:
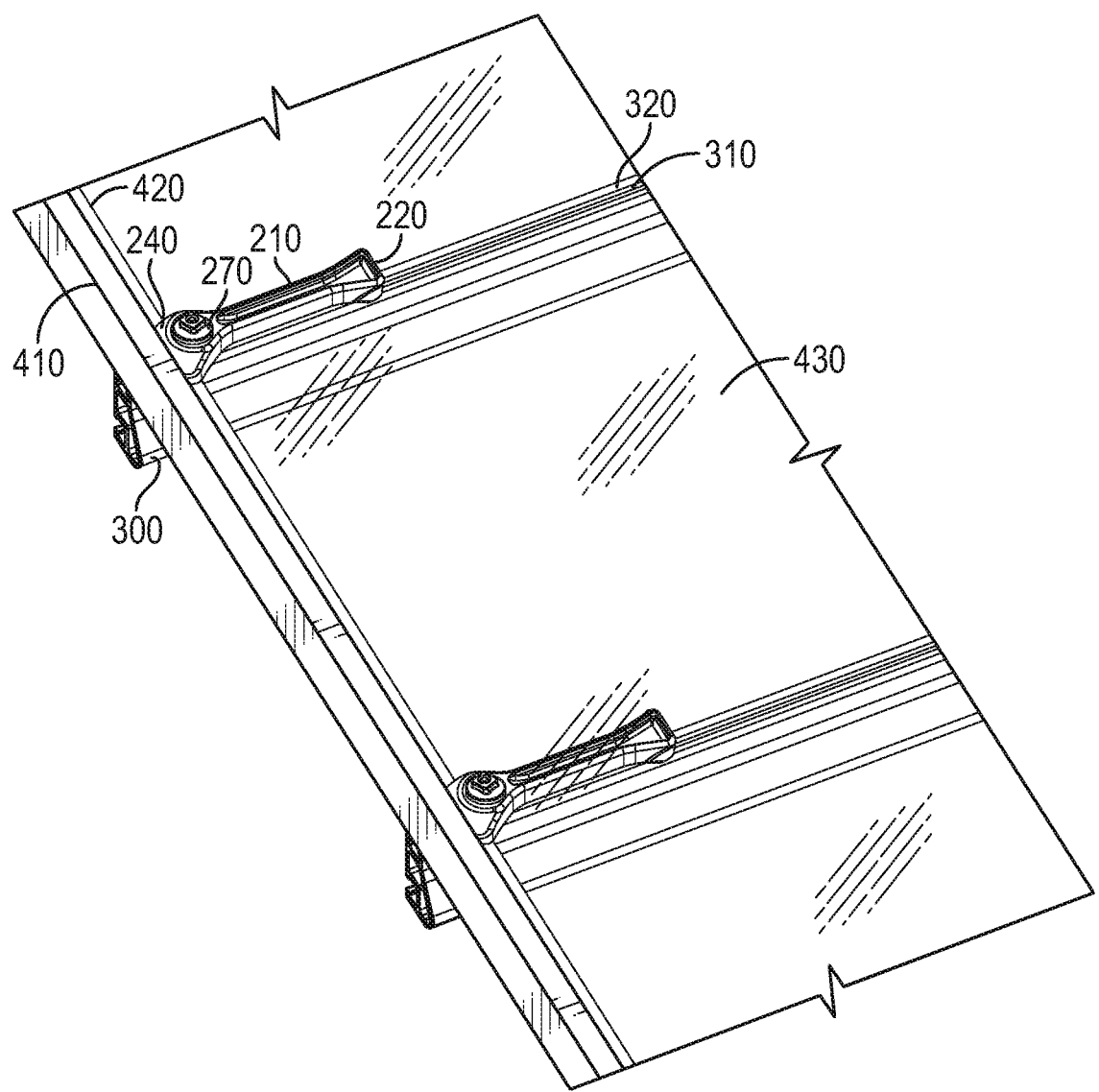
FIG. 23 is a top perspective view showing multiple clamps engaging a solar panel module and rail guides.

Referring to FIGS. 20 and 21, once in position, the back end 220 of the clamp 200 is rotated to a locked position, which is the position when the entire length of the clamp 200 rests directly over the top of the side flanges 320 on rail guide 300 on top of the side flanges 320. The clamp 200 may be rotated in either direction. Ramps 221 and 222 on the underside of the clamp 200 and back end 220 respectively can make the rotation easier. A side view of the images in FIGS. 20 and 21 is shown in FIG. 22. In FIG. 22, one can see that the extension 230 is at a lower planar level than the bottom surface of the front end 240. This enables the extension 230 to snap into place and create a downward compression force on the bottom surface of the front end 240 and the back end 220 of the clamp 200. The snap also provides tactile feedback to the installer that the clamp 200 is secured. The compression force at the front end 240 firmly engages the bottom surface with the bottom flange 420 securing it in place when the extension 230 is firmly engaged on top of the side flanges 320. FIG. 23 illustrates a top perspective view of a solar panel module 400 being secured by multiple clamps 200 across a pair of rail guides 300.

Figure 29:
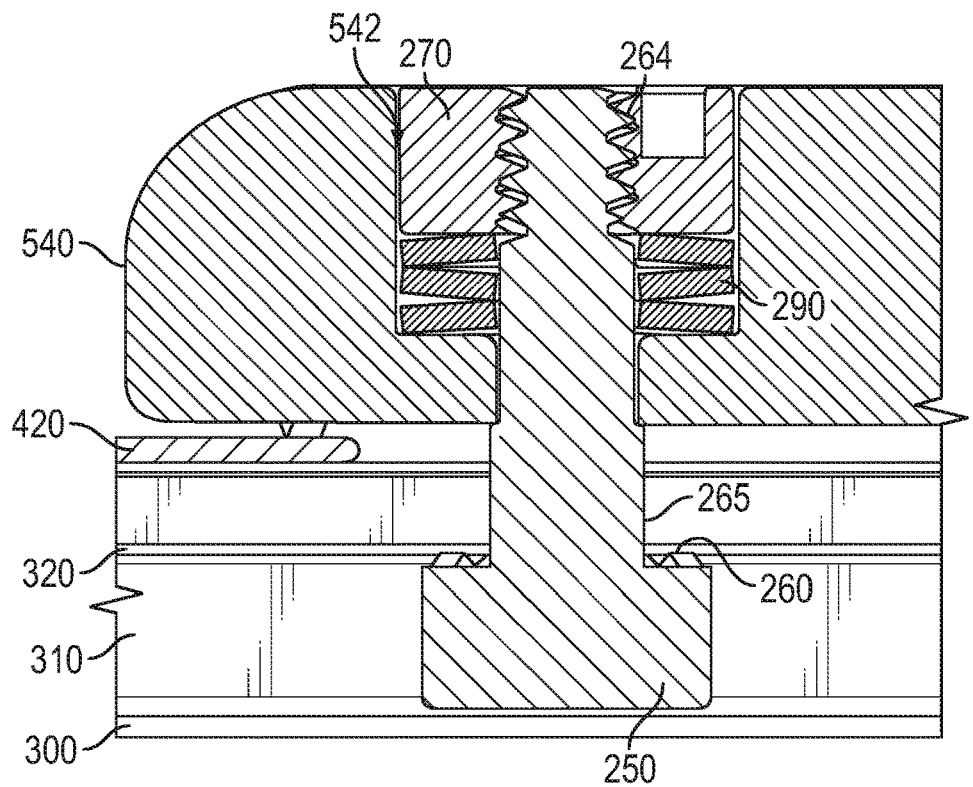
FIGS. 29 and 30 are close-up cross-sectional views of the head of the clamp shown in FIG. 28 when it is securing a flange of the solar panel module to the solar panel rail guide.
Figure 30:
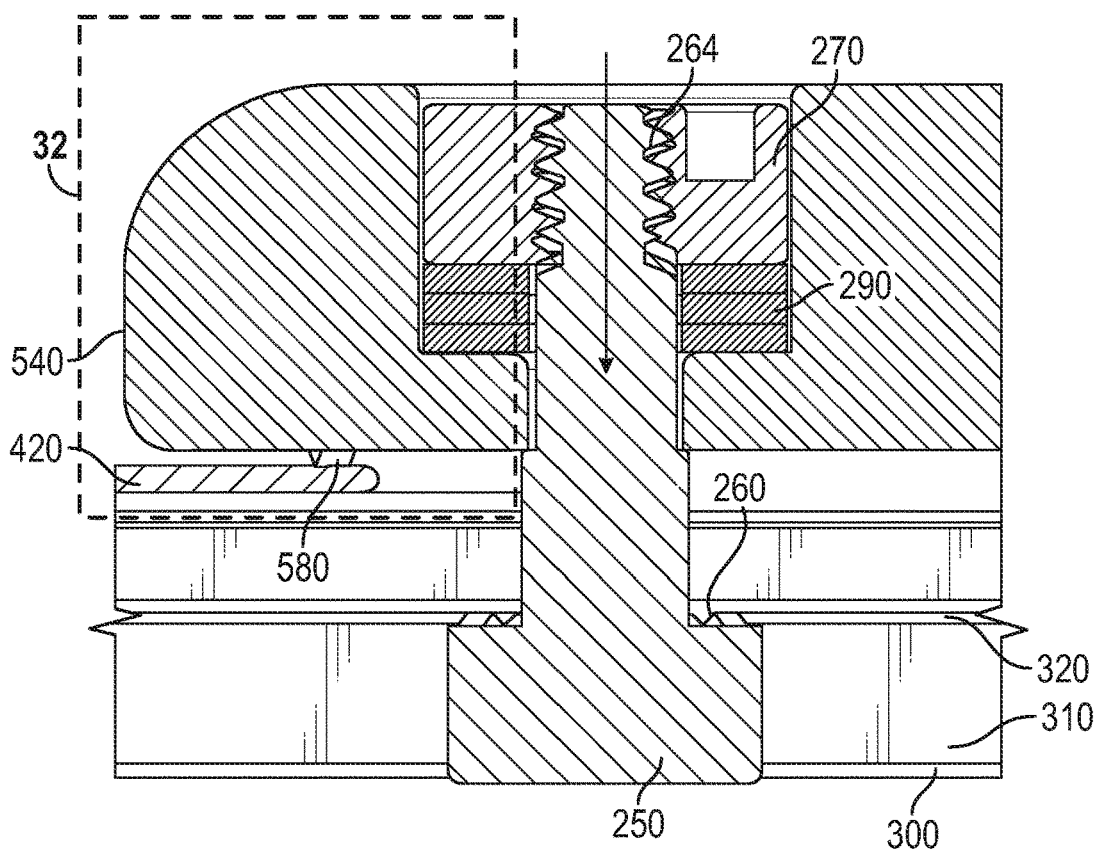

A more detailed illustration of the front end of the assembly is shown in FIGS. 29-32 that demonstrates what occurs when the rear end 220 of the clamp 200 is rotated into the locked position as shown in FIG. 22. FIGS. 29 and 30 show a cross section of the front end 240 after the clamp 200 is rotated into the locked position on thin (FIG. 29) and thick (FIG. 30) module flanges 420. As shown in FIG. 29, the bottom washer 250 rests in the top channel 310, the bottom surface of the front end is engaged with the bottom flange 420, and the springs 290 are partially compressed. FIG. 30 shows what occurs when the module flange 420 is thicker. The springs 290 compress to a more flattened position allowing the front end to move upward to accommodate the thicker flange 420. The serrations 260 of the bottom washer 250 penetrate the oxidation layer on the bottom surfaces of the side flanges 320 and electrically bond the bottom washer 250 to the rail guide 300 as shown in further detail in FIG. 31. The bonding pins 280 on the bottom surface of the front end 240 penetrate the oxidation layer of the bottom flange 420 and electrically bond the clamp 200 to the solar panel module 400 as shown in further detail in FIG. 32. The compression of the springs 290 along the post structure 262 can be adjusted by rotating the top washer 270 clockwise along the threaded portion 264 of the shaft 265. They can also be locked into position in manufacturing so that the installer never has to adjust anything.

Figure 24:
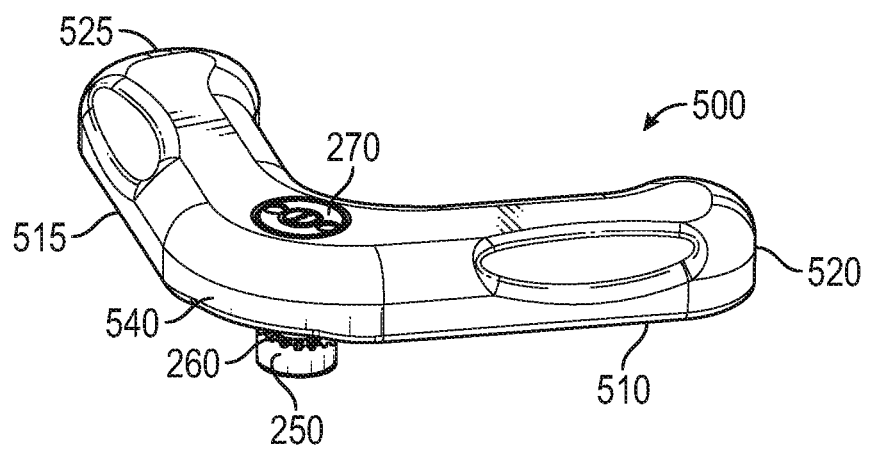
FIG. 24 is an alternate exemplary embodiment of the clamp showing a front perspective view of a dual-handle clamp.
Figure 25:
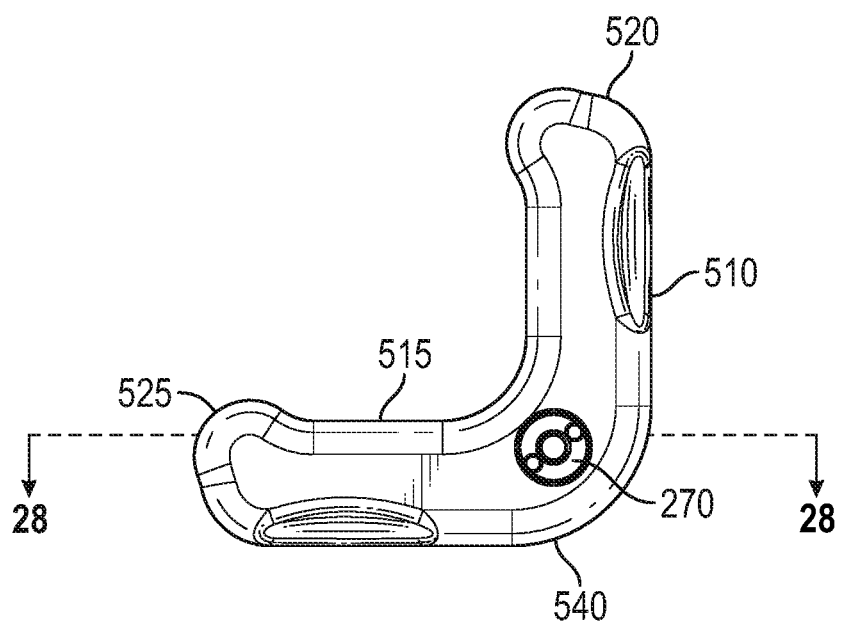
FIG. 25 is a top view of the clamp shown in FIG. 24.
Figure 28:
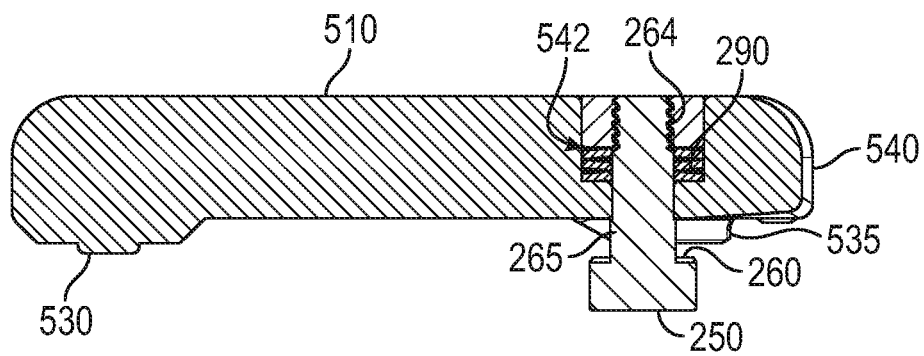
FIG. 28 is a cross-sectional view of the image shown in FIG. 25.

An alternate exemplary embodiment of the clamp 200 is shown in FIGS. 24-42. Referring to the front perspective and top views in FIGS. 24-25 respectively, a dual-handle clamp 500 is shown. The dual-handle clamp 500 has similar characteristics of the clamp 200. The clamp 500 shaped generally like a boomerang with first and second handles 510 and 515 extending outward from a front end 540 that forms a corner of the clamp 500 at approximately 90-degree angles from each other. The first handle 510 has a back end 520, and the second handle 515 has a back end 525. Handles 510 and 515 are identical, but with mirrored features across line A-A in FIG. 25. Just like the clamp 200, the front end 540 includes a channel 542 (shown in FIG. 29) that is identical to the channel 242. The same post structure 262 used in clamp 200 is connected to the top washer 270 through the channel 542 as shown and is assembled using the same optional springs 290 to form a spring structure through the channel 542 as that used in the channel 242 of the clamp 200 as shown in FIG. 28, which illustrates how the post structure 262, the top washer 270, and the springs 290 are assembled in the channel 542.

Figure 26:
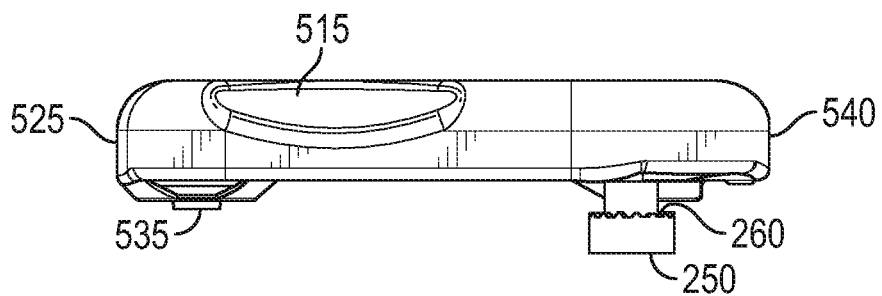
FIG. 26 is a side view of the clamp shown in FIG. 24.
Figure 27:
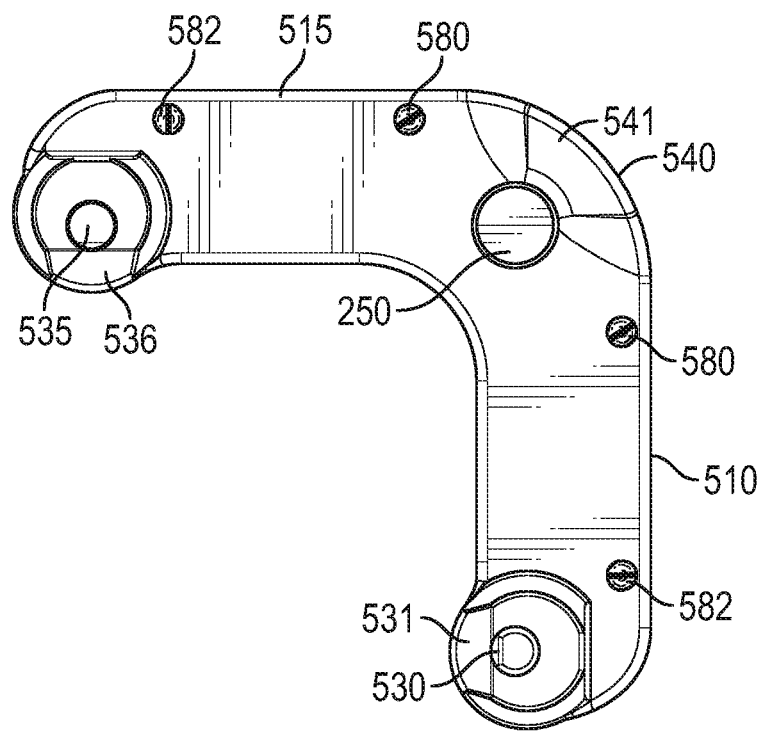
FIG. 27 is a bottom view of the clamp shown in FIG. 24.

Referring to side view FIG. 26, the second handle 515 is shown. The back end 525 further includes an extension 530 that extends downward from the bottom of the rear end. As shown in the bottom view FIG. 27, the front end 540 in this exemplary embodiment is beveled slightly upward so that it will fit over the bottom flange 420 of the solar panel module 400. The back end 525 of the first handle 510 also includes an extension 530, as does the back end 520 of the second handle 515 with an extension 535. These extensions 530 and 535 extend downward and allow each of the back ends 520 and 525 to snap onto the top channel 320 of the rail guide 300. Ramps 531 and 536 near the extensions 530 and 535 can make the rotation easier. Several bonding pins 580 and 582 are also secured to the bottom surface of the clamp 500. In this exemplary embodiment, two bonding pins 580 are shown at the front end 540 of the clamp 500, and two bonding pins 582 toward the rear of the handles 510 and 515 respectively, but generally, at least one bonding pin 580 is secured to each handle 510 and 515 just as described for the front end 240 of the clamp 200. The bonding pins 580 and 582 are typically located along the edge of the bottom surface of the clamp 500.

Figure 33:
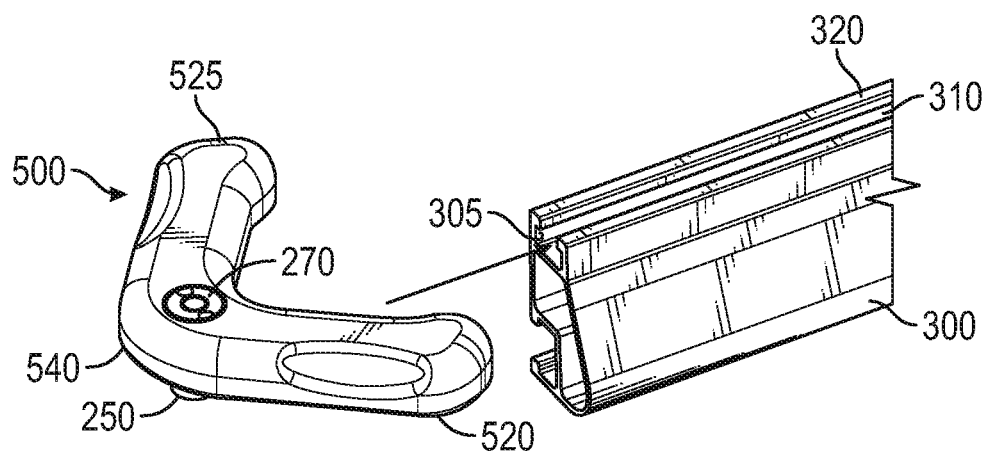
FIG. 33 is a front perspective view of the dual-handle clamp shown prior to insertion into the slot of the rail guide.
Figure 34:
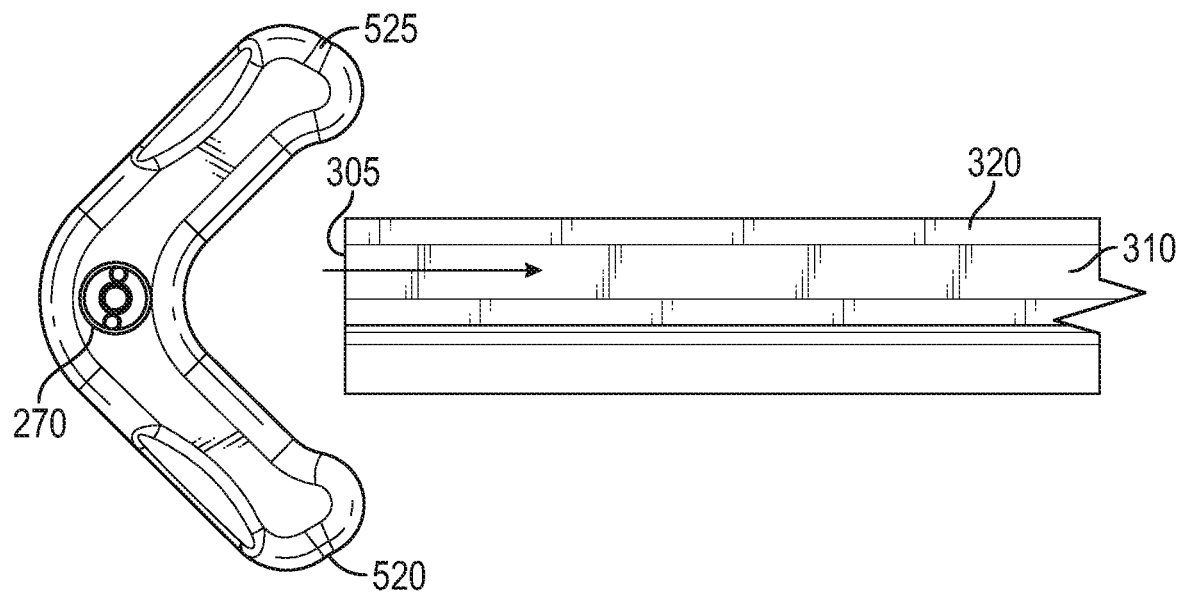
FIG. 34 illustrates a top view of the image in FIG. 33.

FIGS. 33-42 show the steps of using the clamp 500. FIGS. 33 and 34 show a front perspective view and a top view respectively of the clamp 500 before it is engaged with the solar panel rail guide 300. The steps are the same as those used to secure clamp 200 to the rail guide 300.

Figure 35:
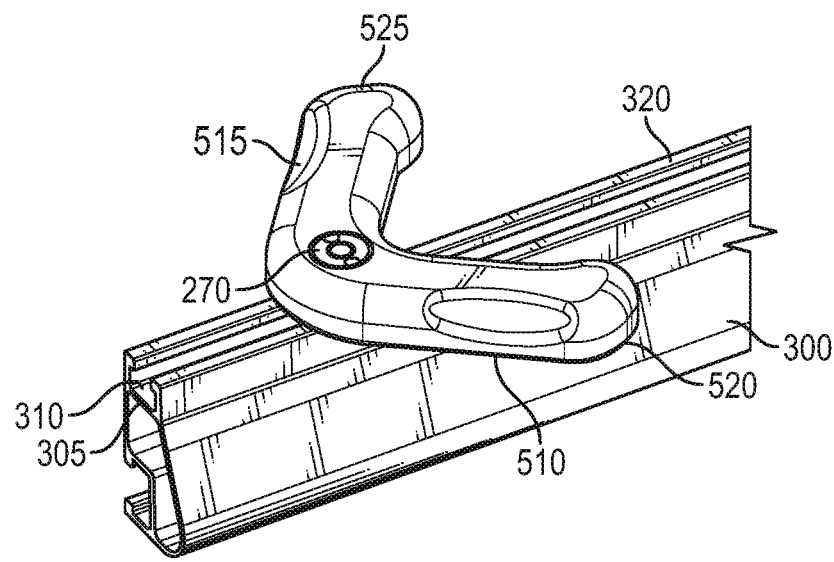
FIG. 35 illustrates a front perspective view of the clamp inserted into the slot of the rail guide.
Figure 36:
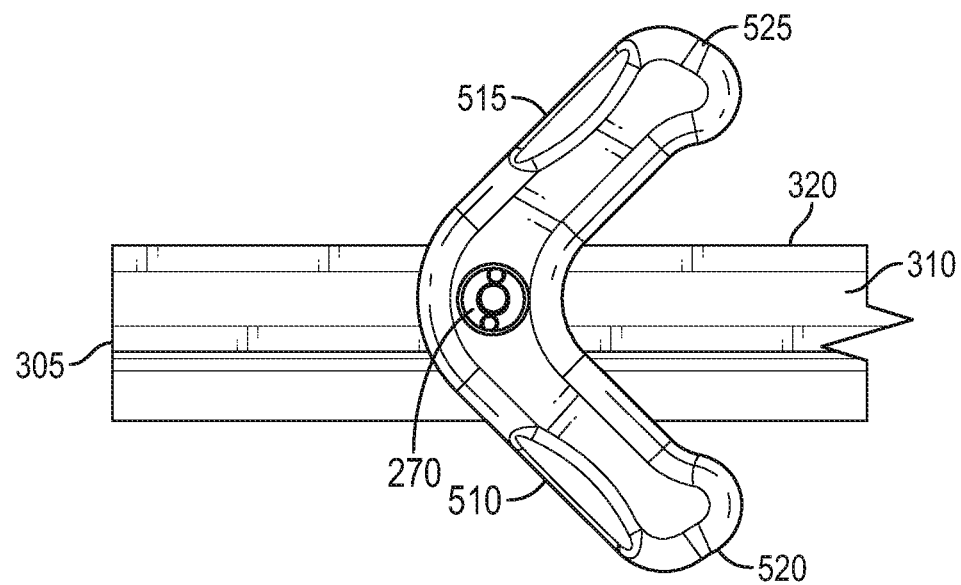
FIG. 36 is a top view of FIG. 35.

The bottom washer 250 of the clamp 500 is first inserted into the front opening 305 of the top channel 310 of the rail guide 300 as shown in FIGS. 35 and 36. As the bottom washer 250 is inserted into the top channel 310, the first handle 510 and second handle 515 should generally face away from the front opening 305 as illustrated.

Figure 37:
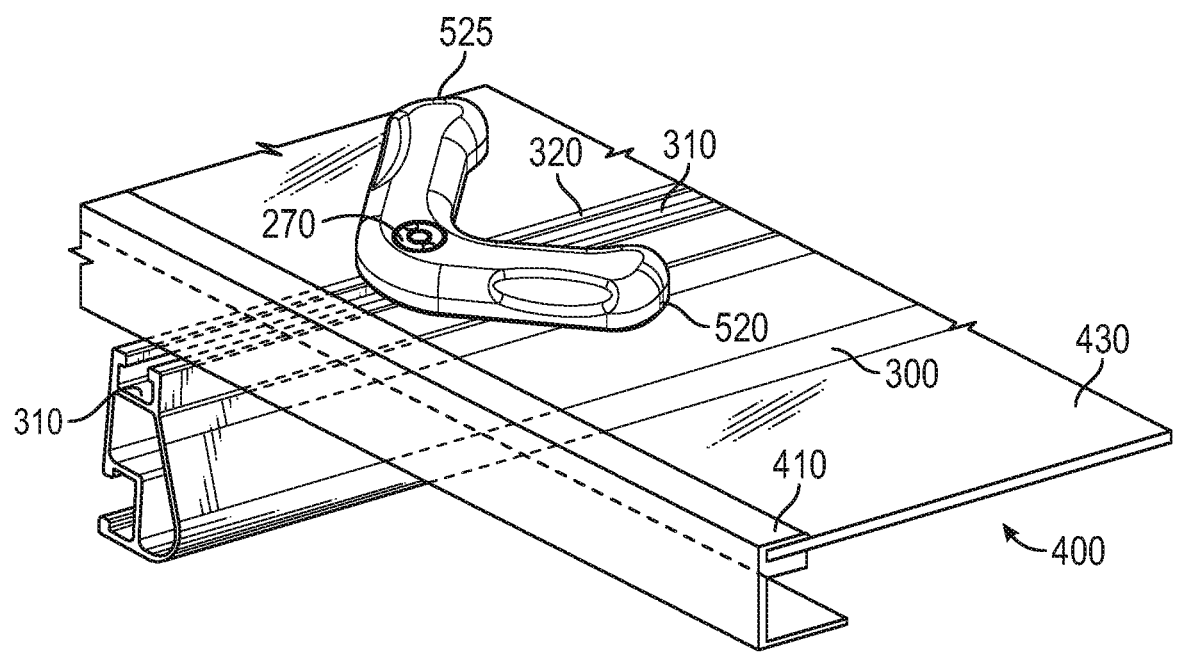
FIG. 37 illustrates the same view shown in FIG. 35 with an exemplary transparent view of a solar panel module resting on top of the rail guide.
Figure 38:
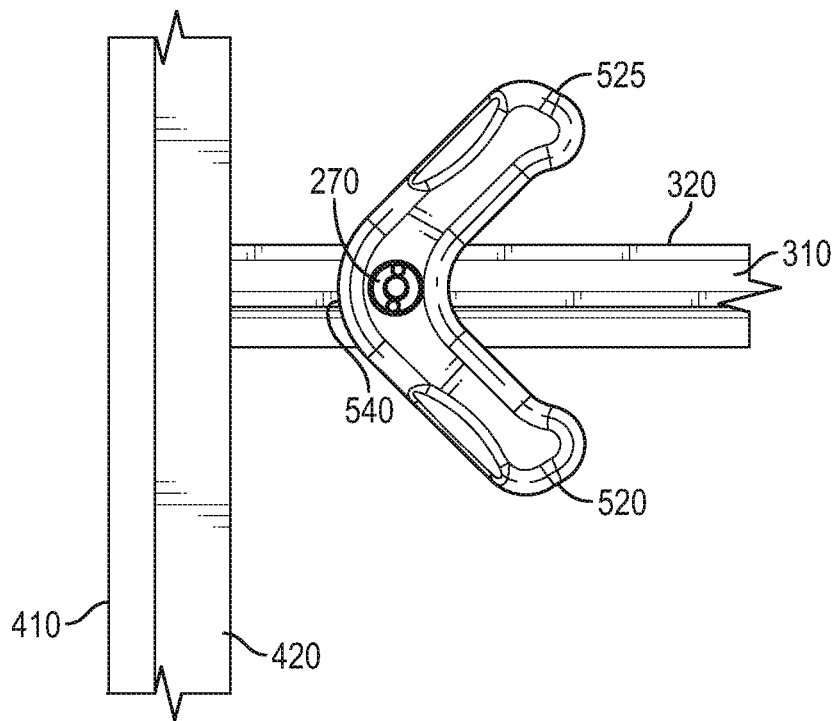
FIG. 38 illustrates a top view of the same image shown in FIG. 37.
Figure 39:
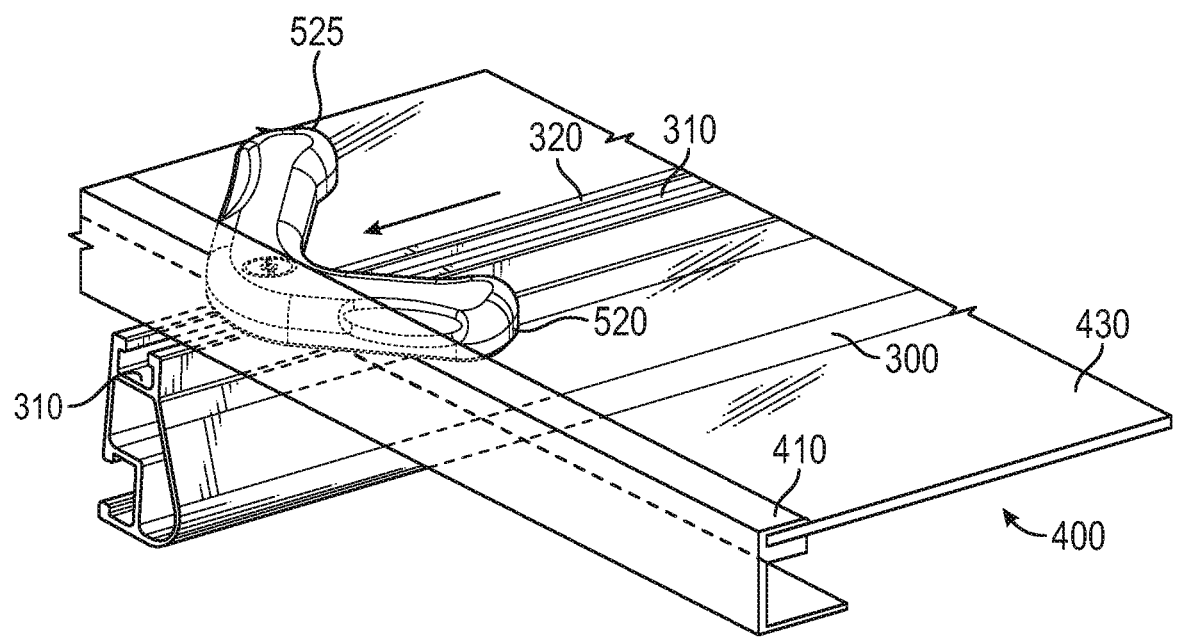
FIG. 39 illustrates the same image FIG. 37 with the clamp moved into position over the top flange at the bottom of the solar panel module.
Figure 40:
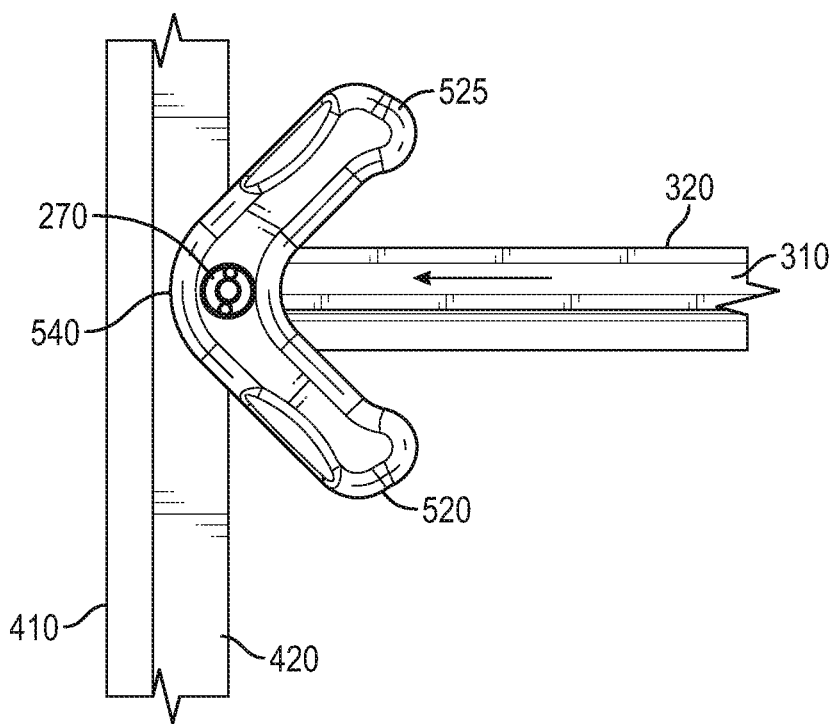
FIG. 40 is a top view of the image in FIG. 39.

Once the clamp 500 is positioned along the rail guide 300, just as described for the clamp 200, the solar panel module 400 is positioned perpendicularly on the top of the side flanges 320 of the rail guide 300 as shown in FIG. 37. FIG. 37 illustrates a front perspective view with a transparent view of the rear wall 410 and FIG. 38 illustrates a top view of the image in FIG. 37 showing the solar panel module 400 that further comprises a bottom flange 420 and the top panel 430 (shown in FIG. 23). Once the solar panel module 400 is positioned along the top of the side flanges 320 of the rail guide 300, the front end 540 of the clamp 500 is moved toward the solar panel module 400 as shown in FIG. 39 so that the front end 540 of the clamp 500 is covering a portion of the bottom flange 420 of the solar panel module 400 as shown in FIG. 40. This typically occurs by moving the clamp 500 so that the shaft 265 directly contacts the edge of the bottom flange 420.

Figure 41:
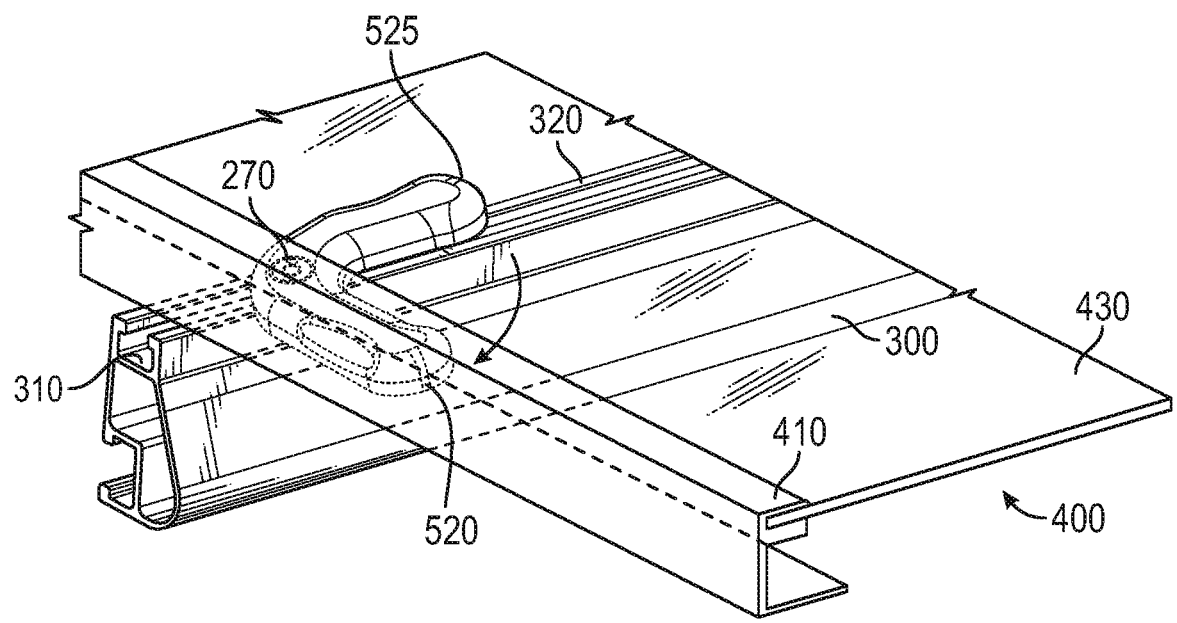
FIG. 41 is a front perspective view showing the clamp rotated to its final position with both the front and rear of one handle of the clamp engaging the rail guide.
Figure 42:
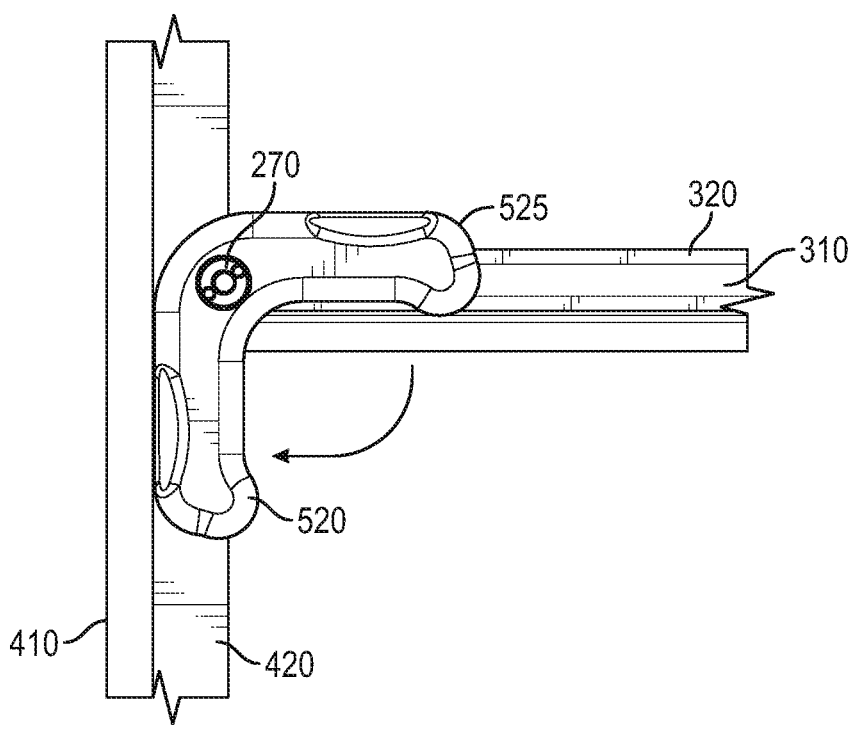
FIG. 42 is a top view of the image shown in FIG. 41.

Referring to FIGS. 41 and 42, once in position, either the back end 520 on the first handle 510, or the back end 525 of the second handle 520 of the clamp 500 is rotated to a locked position, which is when the entire length of either the first handle 510 or the second handle 520 of the clamp 500 rests directly over the top of the side flanges 320 on rail guide 300. Just as with the clamp 200, one can see that the extensions 530 and 535 are at a lower planar level than the bottom surface of the front end 540. This enables the extensions 530 and 535 to snap into place and create a downward compression force on the bottom surface of the front end 540 and either of the back ends 520 or 525 of the clamp 500. The snap also provides tactile feedback to the installer that the clamp 500 is secured. The compression force at the front end 540 firmly engages the bottom surface with the bottom flange 420 securing it in place when either the extension 530 or 535 are firmly engaged on top of the side flanges 320. The clamp 500 can be rotated in either direction. A difference between the install of the single-handle clamp 200 vs. the dual-handle clamp 500 is that the single-handle generally involves a pushing action to move the clamp 200 into the locked position, and the dual-handle clamp 500 generally involves a pulling action to move it into a locked position. Multiple clamps 500 can be assembled similar to the clamps 200 shown in FIG. 23, which illustrates a top perspective view of a solar panel module 400 being secured by multiple clamps 200 across a pair of rail guides 300.

A detailed illustration of the front end of the assembly is shown in FIGS. 29-32a that demonstrates what occurs when either of the back ends 520 or 525 of the clamp 500 is rotated into the locked position as shown in FIGS. 41 and 42. The steps and results of the rotation to the locked position are very similar to what occurs when the clamp 200 is rotated to the locked position. FIGS. 29 and 30 show a cross section of the front end 540, which has essentially the same structure as the front end 240 of clamp 200, before and after the clamp 500 is rotated into the locked position. As shown in FIG. 29, the bottom washer 250 rests in the top channel 310, the bottom surface of the front end 540 is engaged with the bottom flange 420, and the springs 290 are partially compressed to create a clamping force on flange 420. FIG. 30 shows what occurs on a thicker flange 420. The springs 290 compress to a more flattened position while the spring force resists and pulls the front end 540 upward to accommodate the thicker flange 420. The serrations 260 of the bottom washer 250 penetrate the oxidation layer on the bottom surfaces of the side flanges 320 and electrically bond the bottom washer 250 to the rail guide 300 as shown in further detail in FIG. 31. The bonding pins 580 on the bottom surface of either handle 510 or 515 penetrate the oxidation layer of the bottom flange 420 and electrically bond the clamp 500 to the solar panel module 400 as shown in further detail in FIG. 32 and FIG. 32a. The bonding pins 582 on either handle 510 or 515 may also penetrate the top surface of the side flanges 320 to provide additional electrical bonding. The compression of the springs 290 along the post structure 262 can be adjusted by rotating the top washer 270 clockwise along the threaded portion 264 of the shaft 265. or secured in manufacturing to simplify the process for the installer.

Figure 43:
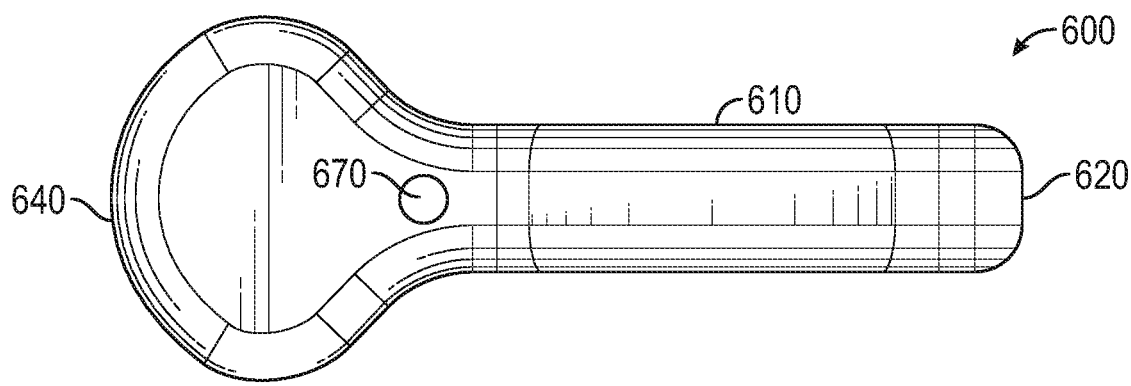
FIG. 43 is a top view of an alternate exemplary embodiment of the clamp illustrated in FIG. 3.

FIG. 43 illustrates a top view of a universal end clamp 600, which is an alternate exemplary embodiment of the clamp 200. The clamp 600 comprises handle 610 with back end 620, and front end 640. The front end 640 is generally curved, but can be of other suitable shapes as well. A top end 670 of a post structure 662 is shown, although the top end 670 does not have to be visible along the top surface of the clamp 600.

Figure 44:
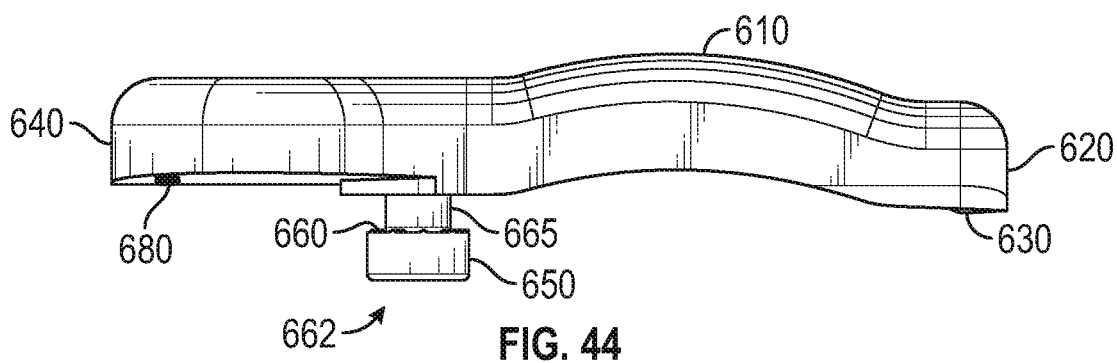
FIG. 44 is a side view of the clamp in FIG. 43.
Figure 45:
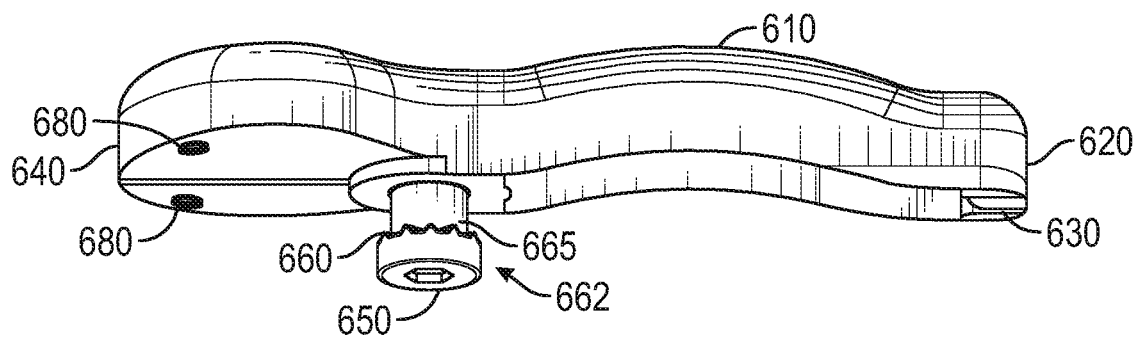
FIG. 45 is a bottom perspective view of the clamp in FIG. 43.
Figure 46:
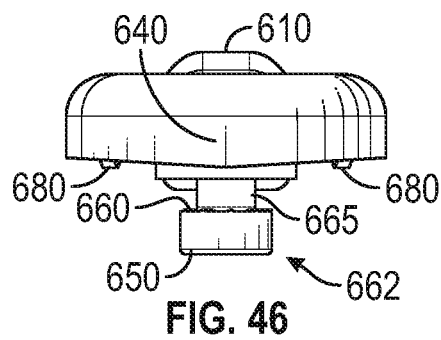
FIG. 46 is a front view of the clamp in FIG. 43.

FIG. 44 illustrates a side view of the clamp 600 and further shows the extension 630 that extends downward from the back end 620. Raised portions 680, typically bonding pins configured to penetrate a surface oxidation layer of a bottom flange 420 on the solar panel 400 and create an electrical bond are also shown. At least one is present on the bottom surface of the front end 640. The post structure 662 is also shown and comprises a bottom washer 650 that includes serrations 660 on the top surface of the bottom washer 650. The serrations 660 are configured to penetrate the surface oxidation layer of the side flanges 320 of the solar panel rail guide 300 and create an electrical bond. A shaft 665 typically extends upward from the top surface of the bottom washer 650 and is coupled to the clamp 600 at top end 670. The post structure 662 can be coupled in any suitable manner such as using a threaded top end into a threaded opening on the bottom of the clamp 600, or it can be molded as part of the clamp 600. FIGS. 45-47 illustrate other views of the clamp 600.

The installation of the clamp 600 operates in the same fashion to the clamp 200 as shown in FIGS. 12-23. In this alternate exemplary embodiment, however, the post structure 662 does not include a spring structure like that in clamp 200. When the rear end 620 of the clamp 600 is rotated into the locked position as shown for clamp 200 in FIG. 22, the bottom washer 650 rests in the top channel 310, the bottom surface of the front end is engaged with the bottom flange 420, and the serrations 660 of the bottom washer 650 penetrate the oxidation layer on the bottom surfaces of the side flanges 320 and electrically bond the bottom washer 650 to the rail guide 300 as shown in further detail in FIG. 31. The bonding pins 680 on the bottom surface of the front end 640 penetrate the oxidation layer of the bottom flange 420 and electrically bond the clamp 600 to the solar panel module 400 like the clamp 500 or 200 without the spring as shown in detail in FIG. 32 and FIG. 32a. They can also be locked into position in manufacturing so that the installer never has to adjust anything.

In each of the exemplary embodiments, no tool is required to install the clamp and secure the solar panel module to the solar panel rail guide. The design allows the array to be installed so that the rails are flush with the sides of the solar panel modules and the hardware hidden from plain view within the array. The mounting rail ends can also be cut straight or jagged. The rail ends can also extend past the edge of the solar panel module or not quite reach the module. In either case, the clamp would not be affected.

What is claimed is:

1. A clamping device for joining and electrically bonding a solar panel to a solar panel rail guide comprising:
   A. a handle comprising:
      i. a front end, and
      ii. at least one rear end,
      iii. the front end comprising a channel extending between a top surface and a bottom surface of the front end;
   B. at least one raised portion positioned at the bottom surface of the front end to provide electrical bonding between the clamping device and the solar panel; and
   C. a post structure, comprising:
      i. an upper end,
      ii. a lower end,
      iii. a shaft, and
      iv. a radial extension at the lower end,
      v. the post structure being coupled to the front end and passes through the channel, wherein the radial extension of the post structure comprises at least one serration that faces towards the bottom surface of the front end to provide electrical bonding between the solar panel rail guide and the clamping device.

2. The clamping device of claim 1, wherein the radial extension at the lower end of the post structure is removable or permanently affixed bottom washer.

3. The clamping device of claim 1, wherein the upper end of the post structure further comprises a top washer, wherein the post structure is configured to couple with the top washer.

4. The clamping device of claim 1, wherein the channel comprises a base.

5. The clamping device of claim 3, wherein the post structure comprises of a spring coupled between the top washer and the base.

6. The clamping device of claim 3, wherein the top washer is configured to compress the spring when the rear end of the handle is moved to a locked position.

7. The clamping device of claim 5, wherein the spring comprises at least one bearing configured to create a clamping force when compressed.

8. The clamping device of claim 7, wherein the bearing comprises a disc spring or a washer.

9. The clamping device of claim 1, wherein the rear end of the handle is configured to provide tactile feedback on moving to a locked position.

10. The clamping device of claim 1, wherein the raised portion comprises a plurality of detachable bonding pins.

11. A clamping arrangement comprising:
    A. a solar panel comprising a bottom flange;
    B. a solar panel rail guide comprising side flanges forming a top channel; and
    C. a clamping device comprising:
       i. a handle comprising:
          a. a front end, and
          b. at least one rear end;
       ii. at least one raised portion provided at the front end; and
       iii. a post structure coupled to the handle at the front end, iv. the post structure comprising:
  a. a lower end,
  b. a radial extension at the lower end, and
  c. at least one serration on the radial extension extending towards the handle;
D. wherein the solar panel is positioned along a top axis of the side flanges of the solar panel rail guide and the post structure is positioned into the top channel of the solar panel rail guide; and
E. wherein the serration on the radial extension engages with the top channel to electrically bond the clamping device with the solar panel rail guide and the raised portion engages with the bottom flange of the solar panel to electrically bond the clamping device with the solar panel.

12. The clamping arrangement of claim 11, wherein the radial extension at the lower end of post structure is removable or permanently affixed bottom washer.

13. The clamping arrangement of claim 11, wherein the raised portion comprises a plurality of detachable bonding pins.

14. The clamping arrangement of claim 11, wherein the solar panel rail guide comprises an electrically conducting material and further comprises a surface oxidation layer on the side flanges.

15. The clamping arrangement of claim 11, wherein the solar panel rail guide further comprises a surface oxidation layer such that the serration penetrates the surface oxidation layer on moving the rear end of the handle into a locked position.

16. The clamping arrangement of claim 11, wherein the bottom flange of the solar panel is covered partially by the front end of the handle when positioned above the bottom flange of the solar panel.

17. The clamping arrangement of claim 11, wherein the bottom flange of the solar panel is an electrically conducting material further comprising a surface oxidation layer.

18. The clamping arrangement of claim 11, wherein the raised portion penetrate the surface oxidation layer of the bottom flange of the solar panel rail guide on moving the rear end of the handle into the locked position.

* * * * *